(12) United States Patent
Blumenau

(10) Patent No.: US 7,836,272 B1
(45) Date of Patent: Nov. 16, 2010

(54) METHODS AND APPARATUS FOR INTERFACING TO A DATA STORAGE SYSTEM

(75) Inventor: Steven M. Blumenau, Holliston, MA (US)

(73) Assignee: EMC Corporation, Hopkinton, MA (US)

( * ) Notice: Subject to any disclaimer, the term of this patent is extended or adjusted under 35 U.S.C. 154(b) by 650 days.

(21) Appl. No.: 11/801,484

(22) Filed: May 10, 2007

Related U.S. Application Data

(63) Continuation of application No. 10/623,103, filed on Jul. 18, 2003, now Pat. No. 7,281,111.

(51) Int. Cl.
G06F 12/00 (2006.01)
G06F 13/00 (2006.01)

(52) U.S. Cl. .................. 711/170; 711/100; 711/154; 711/172

(58) Field of Classification Search .......... 711/100, 711/154, 170, 172
See application file for complete search history.

(56) References Cited

U.S. PATENT DOCUMENTS

| | | | |
|---|---|---|---|
| 4,914,577 | A | 4/1990 | Stewart et al. |
| 5,469,558 | A | 11/1995 | Lieberman et al. |
| 5,517,599 | A | 5/1996 | Shih |
| 5,768,560 | A | 6/1998 | Lieberman et al. |
| 6,067,151 | A | 5/2000 | Salo |
| 6,295,594 | B1 | 9/2001 | Meir |
| 6,381,682 | B2 | 4/2002 | Noel et al. |
| 6,401,181 | B1 * | 6/2002 | Franaszek et al. ........... 711/170 |
| 6,826,697 | B1 * | 11/2004 | Moran ......................... 726/23 |

* cited by examiner

*Primary Examiner*—Tuan V. Thai
(74) *Attorney, Agent, or Firm*—Chapin IP Law, LLC; Barry W. Chapin, Esq.

(57) ABSTRACT

A data storage system includes methods and apparatus that provide volumes for access by host computing devices. The volumes can have a storage size that is independently configurable from an actual amount of data storage that may or may not be associated with the volume. The volumes also have a persistent identifier. The volumes can have any amount of associated storage space allocated to the volume, including none, within the data storage system. Since the storage size and associated storage space are each independently configurable from each other, host that interface with the data storage system can perceive the volumes as being larger than they really are. A dynamic volume configuration technique is provided which allows storage space within storage devices in the data storage system to be dynamically associated and disassociated (i.e., added and removed) from the volumes on an as-needed basis, without requiring disruption of host activities with respect to the volumes. The persistent identifier of a volume allows all hosts and other data storage systems to "see" the volume. This allows a volume in one data storage system to have associated storage space from another volume in another data storage system. Using these techniques, the invention allows software applications and operating systems on hosts that interface to the data storage system to perceive that a volume is always present on the data storage system, even if storage space understood to be associated with the volume from the host's perspective is allocated elsewhere or is non-existent.

20 Claims, 9 Drawing Sheets

METHODS AND APPARATUS FOR INTERFACING TO A DATA STORAGE SYSTEM

CONTINUATION APPLICATION DATA

This application is a continuation of U.S. patent application Ser. No. 10/623,103 entitled, "Methods and Apparatus for Interfacing To A Data Storage System," filed Jul. 18, 2003 now U.S. Pat. No. 7,281,111 which claims priority to earlier filed U.S. patent application Ser. No. 09/342,474, entitled "Methods and Apparatus for Interfacing To A Data Storage," filed Jun. 29, 1999, the disclosure and teachings of which are incorporated in its entirety herein by reference.

FIELD OF THE INVENTION

The present invention relates generally to data storage systems, and more particularly, to an interface mechanism which allows host computing devices to interoperate with the data storage system.

BACKGROUND OF THE INVENTION

The widespread use of computerized data processing systems has created vast amounts of data that must be stored. To serve this need, data storage system providers have developed data storage systems that use tape or disk arrays to store such data. In a typical data storage system using disk or tape array technology, there can be many individual physical storage devices, such as hard disk drives or tape drives. Circuitry and/or software in either the data storage system or in the host computing devices (hosts) which interface to the data storage system can manipulate the way in which data is stored in the various individual storage devices. Various arrangements of the storage devices and of the data maintained in each device are possible. Each arrangement generally allows the storage devices to appear as a single contiguous data repository or as groups of repositories to an application executing on a host that requires storage or access to stored data.

By way of example, a data storage technology such as Redundant Arrays of Inexpensive Disks (RAID) allows a data storage system to present conglomerations of many individual hard disk drives to host computing devices as one or more disk storage areas. In general, the data storage system handles the RAID operations in such a way that they are transparent to the host computing devices which interface to the data storage system. RAID systems also provide various levels of fault tolerance, error correction and error recovery. This allows the hosts to treat a conglomeration of disks within the RAID data storage system without regard to the underlying physical separation or layout of data within or "across" each individual disk drive. For more details concerning RAID technology and systems which implement this technology, the reader is referred to Patterson et al., "A Case for Redundant Arrays of Inexpensive Disks (RAID)," ACM SIGMOND Conference, Jun. 1-3, 1988, the teaching of which are hereby incorporated by reference in their entirety.

The conglomerations of disks presented as a single repository for data to a host computing device from a data storage system are called volumes. A prior art volume identifies and serves as a host interface to the raw physical storage associated with one or more storage devices within the data storage system. Typically, in the prior art, a person known as a systems administrator configures one or more volumes during an initial or periodic configuration process performed on the data storage system. Between configurations, the total amount of available data storage within a prior art volume does not change. For instance, an administrator may configure a data storage system containing four physically separate hard disk drives "A", "B", "C" and "D" to present only two volumes of data storage, V1 and V2, to a host computing device that interfaces to the data storage system. The first volume V1 may be a conglomeration of physical storage space (using RAID or another data-over-multiple-disk technology) located on disks "A" and "B", while the second volume V2 may be a conglomeration of storage space existing within hard disk drives "C" and "D".

A single volume need not be comprised of space from more than one storage device. For example, a volume might be comprised of only a portion of storage space from a single hard disk. In this case, the volume may be equivalent, for example, to a partition, slice or other apportionment of that hard disk.

In any event, prior art data storage systems provide volumes that are essentially interface mechanisms to a host computing device. Generally, in the prior art, a single host directly interfaces (i.e., via a SCSI bus or other connection mechanism) to the data storage system and "serves" the data from the data storage system onto a network for access by other hosts, which do not directly interface to the data storage system. The volumes appear to the server host as individual contiguous repositories for data. Within the data storage system, however, the volumes may actually span portions of one or more storage devices (e.g. disk drives, tape drives, and so forth). Providing volumes insulates server software applications and server host computing devices from the details of complicated data and disk storage mechanisms such as mirroring, error correction, striping and so on. From here on in this description, a host or host computing device generally refers to a host (i.e., a server) that directly interfaces with a data storage system.

Generally, when a host computing device starts-up or "boots", an operating system that controls the host polls any attached data storage systems via device drivers to determine what volumes are available for access to the host computing device within the data storage system. By way of example, a host executing a version of the Solaris operating system (a variant of Unix), which is manufactured by Sun Microsystems of Mountain View, Calif., (Solaris being a registered trademark of Sun Microsystems Inc.) can use an operating system call, such as "report LUNS" for a SCSI-3 device, to poll the SCSI port coupled to the data storage system in order to determine volume availability. In response to the host poll, the data storage system provides a list of available volumes in the given target device. Host-specific access information stored in the volumes may be reported back to the host as well.

A host filesystem in the host computing device can then access a particular volume by "mounting" a volume identifier associated with the volume (obtained from the initial poll) that is provided from the data storage system to a "mount point" within the host filesystem. A filesystem mount point is essentially a stub directory within the host filesystem that serves as an entry point into the volume once the host has mounted the volume. After the host has mounted the volume, software applications on the host can access data in the volume by referencing the mount point directory and any subdirectories that are now available within the mounted volume of data storage. For example, in a computing device controlled by the Unix operating system, a mount point may correspond to a directory within the Unix filesystem, such as "/home". A system command such as mount /home /dev/dsk/c0t0d0s0 can be used to mount the volume identified by "/dev/dsk/c0t0d0s0" to the mount point "/home" in the Unix filesystem. After the volume is mounted, users or applications executing on the computing device can reference files and data within the /home directory and any subdirectories within /home that actually exist within the data storage associated with the volume. That is, all data accessed within the /home directory is physically maintained on storage space within storage devices (e.g., hard disk drives) that are associated with the mounted volume "/dev/dsk/c0t0d0s0" in the data storage system.

Most operating systems rely on volumes provided by a data storage system for certain operations. For example, many host operating systems expect storage space within volumes to be organized into sequential blocks of data ranging from Block 0 to Block N. Many operating systems frequently store certain host-specific volume directory information, partition information, track/sector layout and size information, and so forth on a predetermined designated portion of storage space within a volume. Block 0 (i.e. the first block) of a volume is frequently used for storing such host-specific data. As another example, the Microsoft Windows NT operating system, manufactured by Microsoft Corporation of Redmond, Wash., performs periodic checks to make sure that a mounted volume is always accessible within the data storage system. Windows and Windows NT are registered trademarks of Microsoft Corporation.

Generally, once an operating system of a host computing device mounts a prior art volume, the host and/or the data storage system cannot change the amount of available storage space (i.e. the size) within the volume while the volume remains mounted. Thus, if a host mounts a ten Gigabyte volume of data storage, the host operating system and any host software applications can have access to the full ten Gigabytes of data storage within that volume as a single contiguous portion of storage space. However, the amount of data that can be stored on such a volume is limited to ten Gigabytes, less any space used for volume formatting requirements, such as the Block 0 information. In order for more storage space to be associated with (i.e. added to) the volume, a systems administrator for the host must unmount the volume and reconfigure the volume size by associating additional storage devices to the volume within the data storage system. Once the systems administrator reconfigures the volume size, the systems administrator can again present the volume to the host operating system as available data storage space.

Reconfiguration of a volume (i.e., to add or remove or move data storage space) typically requires high-level systems administrator (e.g. "root") privileges on the host computing device. For example, during volume reconfiguration, the host operating system must be brought into a special restricted user mode (e.g. single-user mode). The restricted user mode ensures that no host application programs are attempting to access data within the volume while reconfiguration is in progress. Once reconfigured, the host operating system may need to be re-started or "re-booted" in order for the operating system to re-poll the attached data storage system to discover the newly re-configured volume(s) containing the additional storage space.

The access information stored by a host operating system in Block 0 of a volume is often specific to a particular operating system or host architecture. By way of example, if a version of the Solaris operating system is used to configure and mount a volume, Block 0 of that volume may contain Solaris-specific volume access information. If the data storage system that contains the Solaris-specific volume is subsequently interfaced with another host computing device that uses a different operating system or architecture, such as Microsoft Windows NT, the access information in Block 0 of the Solaris-specific volume may not be suitable to allow access to the volume by the Windows NT controlled computing device. This is because volume labeling information provided by Solaris in Block 0 of the volume is not be compatible with volume labeling information required by Windows NT.

Certain software application programs that execute on host computing devices also rely on the existence and correct operation of volumes. For instance, a data storage application called TimeFinder, manufactured by EMC Corporation of Hopkinton, Mass. (TimeFinder is a trademark of EMC Corporation), allows a data storage system to create and continuously maintain a mirror image volume of a master volume. While the mirror image volume is continuously being maintained as a copy of the master volume (reflecting all changes made to data within the master volume), both the mirror image volume and the master volumes are "visible" to the host operating system that is interfaced to the data storage system. From time to time, the TimeFinder software can detach the mirror image volume from its synchronous relationship with the master volume. TimeFinder may detach the mirror image volume from the master volume, for example, to allow the mirror image volume to be used for offline application testing or periodic backup purposes on dedicated backup host. This allows the master volume to remain accessible the regular host computing devices thus providing uninterrupted access to data in the master volume. Such a system is valuable in mission critical systems requiring around-the-clock access to data. When the offline operations (i.e., backup or testing) on the mirror image volume are complete, TimeFinder reinstates the synchronous relationship between the mirror image volume and the master volume so that the mirror image volume can be brought back up-to-date with the master volume to reflect any changes that may have occurred in the master volume during the backup of testing processing.

As another example of the reliance on volumes for the proper operation of host software applications, certain host application programs may require a minimum amount of storage space to be available within a volume before allowing processing within the application to proceed. This may be the case, for example, when a database program attempts to initially access a volume of storage to create a new database. The database application may have minimum storage size requirements with respect to the volume in order to allow processing to proceed beyond a certain point.

SUMMARY OF THE INVENTION

Prior art data storage systems that use conventional techniques to create, maintain and manage volumes of data storage within a data storage system suffer from a number of deficiencies. Embodiments of the present invention are based, in part, on the recognition of these deficiencies and provide solutions to overcome them. The techniques of the invention also go beyond solving problems of prior art systems and provide unique mechanisms related to volumes within data storage systems that provide significant advancements in the state-of-the art.

Prior art data storage systems provide volume interfaces which are static in configuration. Once a volume is configured, its association to specific storage devices within the data storage system cannot change unless the volume is reconfigured. As noted above, reconfiguration must be performed while the prior art volume is in an off-line state with respect to host computing devices. Moreover, a systems administrator must reboot the operating systems on most host computing devices that require access to a newly configured volume, which results in significant overhead and lost processing time.

Prior art volumes provided by conventional data storage systems are also static in storage size. The storage size or total amount of data storage capacity within a prior art volume is directly dependant upon how much storage space is present within the storage devices (or portions thereof) that are associated with the prior art volume at volume configuration time. The concepts of storage size and actual storage space associated with a prior art volume are essentially one in the same in prior art data storage systems. That is, the process of associating storage devices to the volume during volume configuration inherently determines the storage size of a volume based upon the actual amount of storage space associated with the volume. The storage size of a volume cannot be configured separately or changed independently of the associated storage space. For example, one generally cannot separately associate some storage devices to a volume and then arbitrarily select a size for that volume which is different that the actual amount of space within the associated storage devices. Thus, the storage size of a volume as seen by a host is the actual amount of storage space provided by that volume. Also, prior art volumes cannot exist in a data storage system without some minimum amount of storage space associated with the volume. In other words, prior art volumes with a size of zero cannot exist in a conventional data storage system.

Another deficiency of conventional data storage systems is that these systems do not provide adequate support for multiple hosts to access the same volume in many circumstances. For example, two different hosts architectures that use different operating systems that try, for example, to directly connect to the same data storage system and mount the same volume of data storage can frequently experience problems due to incompatibilities between host-specific access information, such as that stored in Block 0, as required by each host. Since each different operating system attempts to maintain its own host-specific access information in Block 0 of the volume, the two disjoint host architectures can experience difficulties when each attempts to decipher the host-specific access information created by the other host.

Due to the aforementioned examples of deficiencies with prior art data storage systems, certain other problems may be encountered when host computing device software applications and operating systems attempt to interact with prior art volumes in various circumstances. For instance, data storage applications that create and continuously maintain a mirror image volume of a master volume can experience problems when the mirror image volume is taken "off-line" for backup or testing purposes. This is frequently the case, for example, when using the Windows NT operating system on a host. Certain mechanisms within Windows NT periodically attempt to access or "touch" all volumes that are "visible" or that are known to exist to Windows NT. When using the mirroring application, the mirror image volume can be periodically become "visible" and "invisible" to the host as the mirror image volume is taken offline for backup or testing purposes. When this occurs, Windows NT may experience a fault since the volume is no longer visible to the operating system when the operating system performs its periodic volume access or touch. If a fault does not occur when the mirroring application removes the volume from the host, when the operating systems performs a subsequent periodic access or touch, the operating system may reset the number of "visible" volumes that are apparent to Windows NT. However, when the mirroring application subsequently reattaches the mirror image volume to the host in order to re-synchronize data with the master volume, the appearance of the unknown mirror image volume (without rebooting Windows NT) may cause Windows NT to experience difficulties.

Other problems are presented when prior art volumes are used with software applications as well. For example, certain software applications have requirements for certain minimum volumes sizes in order to operate properly. These applications may encounter difficulties if a prior art volume is pre-configured to a static size that becomes too small for future use. In a database application, for example, if a systems administrator configures a prior art volume with ten gigabytes of storage device space, and the database application later requires fifteen gigabytes within the volume, the systems administrator must reconfigure the ten gigabyte volume to contain more associated storage. Not only is volume reconfiguration cumbersome for the reasons noted above, but the systems administrator must purchase or otherwise obtain the additional five gigabytes of storage device space.

Many of the problems experienced by applications and operating systems that interact with prior art data storage systems and volumes stem in part from the fact that prior art volumes only exist when the configuration process allocates storage device space to the volume. That is, a prior art volume is essentially equivalent to, and un-attachable from, the storage space associated with the volume. Thus, in the above example of the mirroring application, if the mirror volume's storage is required elsewhere (e.g. for use in testing on another host system), when the mirroring application removes the mirror image volume from the master host system making it no longer "visible" from the perception of the master host operating system, the master host operating system may crash.

The present invention provides an alternative to prior art data storage systems and volume creation and management techniques and solves many of the deficiencies found in such systems. To do so, the present invention specifically provides a system and method within a data storage system that provide an interface to a data storage system. The interface of the invention is called a volume in this description. To provide the interface, the system defines a volume within the data storage system. The volume can have an associated identifier. The system creates the volume when there are storage devices associated with the volume, and when there are no storage devices associated with the volume. The system provides the volume as a volume of available data storage to a computing device which is external to the data storage system. The volume of storage is accessible with the associated identifier. In accordance with the invention, since the volume can exist in the data storage system even if no storage devices (i.e., storage space) are associated with the volume, hosts that interface to the data storage system that require the mere existence of a volume can operate effectively.

To define the volume, the system of the invention identifies a number of storage devices and associates the identified number of storage devices with the volume. The system also selects a storage size for the volume. These two steps are preferably performed independent of each other. That is, selecting a storage size for the volume can be done independent of the identified number of storage devices associated with the volume. Alternatively, the selected storage size may be dependent on an amount of data storage associated with the identified number of storage devices associated with the volume. In yet another alternative configuration, however, the selected storage size for the volume may be independent of any storage devices associated with the volume. In yet another configuration, the selected storage size for the volume may be dependent but different from of an amount of data storage associated with storage devices associated with the volume. In this manner, the volumes provided by the invention can be perceived by the hosts as having one size, when in reality, they have a different amount of actual associated storage space within the data storage system.

A configuration is provided in which there are no storage devices associated with the volume and the volume indicates a storage size that is greater than zero. Another configuration is provided in which there are no storage devices associated with the volume and the volume indicates a storage size that is zero. As will be explained, these configurations overcome may of the problems associated with prior art systems.

In accordance with another configuration of the invention, the associated identifier of the volume is a persistent identification and the system provides the volume to as a volume of available data storage and provides access to the volume to a plurality of networked computing devices, each of which perceives the volume with the persistent identification.

The system of the invention also provides a dynamic volume reconfiguration process which detects a requirement for a storage device to be associated with a volume in the data storage system. The system can then determine if the volume contains an association to an identity of the storage device, and if not, the system can dynamically create, in the volume, an association to the identity of the storage device thus causing the storage device to be accessible via the volume. The system then provides access to the storage device through the volume. This allows storage space to be added to the volume when needed. For instance, in another configuration, when the system detects a requirement for a storage device, this process is initiated by an attempted access to a requested storage device understood by a computing device to be associated with the volume. Thus, as hosts access volumes of this invention, space can be dynamically added to the volumes on an as-needed basis.

Alternatively, the process of detecting a requirement for a storage device in a volume may be initiated by detecting a presence of a threshold amount of occupied storage associated with the volume. In another alternative configuration, process of detecting a requirement for a storage device is initiated by detecting a trend in an amount of storage use associated with the volume.

The dynamic reconfiguration process can also remove storage space from a volume. To do so, embodiments of the invention can detect a requirement, for a non-required storage device that has an existing association with the volume, to no longer be associated with the volume in the data storage system. The system can dynamically remove, from the volume, the association to the identity of the non-required storage device in the data storage system, thus de-allocating the non-required storage device from the volume while continually providing the volume as a volume of available data storage in the data storage device. This allows the de-allocated storage space to be used for other purposes, such as backup or testing.

In accordance with one embodiment, the process of dynamically removing maintains a storage size associated with the volume that is the same before and after removal of the association of the identity of the non-required storage device from the volume.

Another embodiment of the invention provides a systems that allows access to data by multiple computing devices through a volume in a data storage system. The system can receive an access request to the volume by a computing device and can retrieve access information within the volume that is specific to the computing device requesting access to the volume. Then, the system can provide, to the computing device, the access information to allow the computing device to properly access the volume. This allows multiple hosts to access the volume, even though each may have different access information.

In a more particular configuration, the system determines if the volume contains volume information that is different from volume information contained within the access information, and if so, replaces, within the access information, the volume information that is different with the volume information from the volume. This allows the volumes provided by a data storage system in accordance with the invention to provide consistent volume information to a host computing device, even if the host computing device attempts to use information within its host-specific access information to determine volume characteristics.

As an example, in one configuration, if the volume information that is different is storage size information in the volume to which access is requested, the storage size information contained within the access information provided to the computing device is storage size information obtained from the volume instead of actual storage size information related to storage devices associated with the volume.

In other embodiments of the invention, wherein the computing devices may operate using different architectures, the process of retrieving access information determines an identity of the computing device attempting to access the volume and retrieves architecture specific access information for the volume for that computing device from the volume based on the identity of the computing device. In a variation of this configuration, the different architectures can be different operating systems which execute on the computing devices. In this case, the system of the invention provides to the computing device the architecture specific access information including operating system block organization information relating to how the operating system of the computing device stores blocks of data in storage devices associated with the volume. In these embodiments, the access information may be specific for each of the plurality of computing devices.

Other embodiments of the invention provide a data storage system that includes a host interface capable of coupling to at least one computing device. Also included is a storage device interface capable of coupling to one or more storage devices maintained within the data storage system. A memory is coupled to the host interface and the storage device interface. The memory contains a volume which can have an associated identifier. The volume exists in the memory as an accessible volume for access by computing devices via the host interface. The volume exists when there are storage devices associated with the volume, and when there are no storage devices associated with the volume. As explained above, this aspect of the invention allows volume to exist which may use little or no storage in the data storage system.

The volume in the memory may include storage size indicating an available amount of data storage associated with the volume. The storage size can contain a value that is programmable and is dependant, but different than a size of any storage devices associated with the volume via the storage device interface.

The data storage system can also include at least one storage device coupled to the storage device interface. In this configuration, the storage device can have a portion associated with the volume. The portion can have an actual size and the volume in the memory includes a storage size indicating an available amount of data storage associated with the volume. The storage size may contain a value that is not equal to the actual size of the at least one storage device associated with the volume. In this manner, the actual amount of storage space associated with the volume is not that same as that indicated by the storage size of the volume presented to host computing devices.

Also in the data storage system in this invention, the associated identifier of the volume may be a persistent identification containing a value unique to the volume. In this case, the host interface includes a means for providing the volume as a volume of available data storage to a plurality of networked computing devices. Each of the networked computing devices perceives the volume with the persistent identification that is the same. This configuration allows the data storage system to be accessed by separate hosts using identifiers that are the same for the same volumes.

The data storage system also contains a means for detecting a requirement for a required storage device to be associated with the volume in the data storage system and a means for determining if the volume contains an association to an identity of the required storage device through the storage device interface. If no association is present, a means is provided for dynamically creating, in the volume, an association to the identity of the required storage device through the storage device interface, thus causing the required storage device to be allocated to the volume. Also, a means is provided for providing access to the required storage device through the volume using the host interface.

Also in this configuration, the data storage system can further include a means for detecting a requirement, of a non-required storage device that has an existing association with the volume through the storage device interface, to no longer be associated with the volume in the data storage system. Further provided in this configuration is a means for dynamically removing, from the volume, the association to the identity of the non-required storage device through the storage device interface in the data storage system, thus de-allocating the non-required storage device from the volume while the volume continually appears, via the host interface, as a volume of available data storage having an unchanging storage size in the data storage system. This configuration allows storage space to be added and removed as needed to and from the volume without disturbing host interaction with the volume.

In another configuration of the data storage system, the memory is coupled to the host interface and the storage device interface and the memory contains a volume. The volume contains a plurality of sets of access information allowing a plurality of specific computing devices to access data stored on the at least one storage device according to the a particular arrangement associated to each of the plurality of computing devices. Also provided is a means for storing access information for at least one storage device. The access information is specific for each of a plurality of computing devices that can access the at least one storage device. This configuration allows different host operating systems to directly interface and simultaneously access the same volume, since the access information required for each host is maintained for each storage device within the volume.

A specific computing device can interface, for example, via the host interface, with the data storage system. A label manager is provided in this configuration and is coupled to the host interface and to the memory. The label manager receives, via the host interface, an access request from the specific computing device to the volume in the memory. The label manager can retrieve one of the sets of access information within the volume that is associated with the specific computing device requesting access to the volume and can provide, to the specific computing device, the retrieved set of access information to allow the specific computing device to properly access the volume.

Also included in this label manager configuration is a means for determining if the volume contains volume information that is different from volume information contained within the retrieved set of access information, and if so, a means is provided for replacing, within the retrieved set of access information that is provided to the specific computing device, the volume information that is different with the volume information from the volume. This allows the volumes provided by the invention to present consistent information to host computing devices, even if those hosts have their own information relating to volume parameters that might be different than that maintained within the volume in the data storage system.

For instance, in one configuration, the storage size information contained within the set of access information provided to the specific computing device is storage size information obtained from the volume, instead of actual storage size information related to storage devices associated with the volume.

The different access information is provided to accommodate different host operating systems and architectures that require access to the same volume. As such, a configuration of the invention is provided that includes a means for determining an identity of the specific computing device attempting to access the volume. Also, a means is provided for retrieving, from the volume, architecture specific access information associated with a storage device having an association with the volume for that specific computing device based on the identity of the specific computing device. More specifically, if the different architectures are different operating systems, the label manager further comprises a means for providing, to the specific computing device, the architecture specific access information which can include operating system block organization information relating to how an operating system of the specific computing device stores blocks of data associated with the storage device having an association with the volume for that specific computing device.

The data storage system can also include a means for determining if the volume to which access is requested contains an association to an identity of a required storage device that is associated with the access information provided to the specific computing device, and if not, can dynamically create, in the volume to which access is requested, an association to the identity of the required storage device thus causing the required storage device to be allocated to the volume. The above means are preferably provided by a programmed microprocessor within the data storage system and the volumes of the invention are preferably maintained in a channel director.

In another embodiment of the invention, a method provides a volume interface to a data storage system. The method includes the steps of receiving a request from a computing device for a volume in the data storage system and providing, from the data storage system to the computing device, in response to the request, a volume that satisfies the request when there are storage devices associated with the volume, and when there are no storage devices associated with the volume.

Embodiments of the invention are also provided that consist of computer programs encoded onto computer readable mediums, such as memory devices, disks, and so forth. Preferably, these embodiments are in the form of a computer program product having a computer-readable medium including computer program logic encoded thereon. The computer program code allows a data storage system to provide an interface to the data storage system as explained herein, when the computer program logic is executed on at least one processing unit with the data storage system. The computer program product is preferably a hard disk, floppy disk, optical or CD-ROM disk, or other computer-readable media. Such a disk encoded with instructions that perform any of the methods of the invention as explained herein is itself considered an embodiment of the invention.

Thus, a computer readable medium such as a disk or Read Only Memory (ROM) or Random Access Memory (RAM) chip, that is separate from a data storage system, but that is encoded with computer program instructions, that, if compiled and executed, or just executed on processor within a data storage system, would cause the data storage system to create, maintain, and manipulate the volumes of the invention, and/or would otherwise operate using the inventive techniques described herein, is to be understood to be an article of manufacture and is considered an embodiment of this invention. The disk, memory, or medium need not be loaded or installed on any data storage system, processor, host or other computing device, but may simply exist alone or contain the encoded computer software code that provides the aforementioned operations. The software to carry out these instruction may be written in any type of computer code, including such languages as C, C++, Java, assembly language, or a proprietary language, and so forth, or may exist as complied object code ready for execution by a processor.

An example embodiment of a data storage system configured according to the invention is any one of the Symmetrix data storage systems manufactured by EMC Corporation of Hopkinton, Mass. Symmetrix is a registered trademark of EMC Corporation.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION OF PREFERRED EMBODIMENTS

Figure 1:
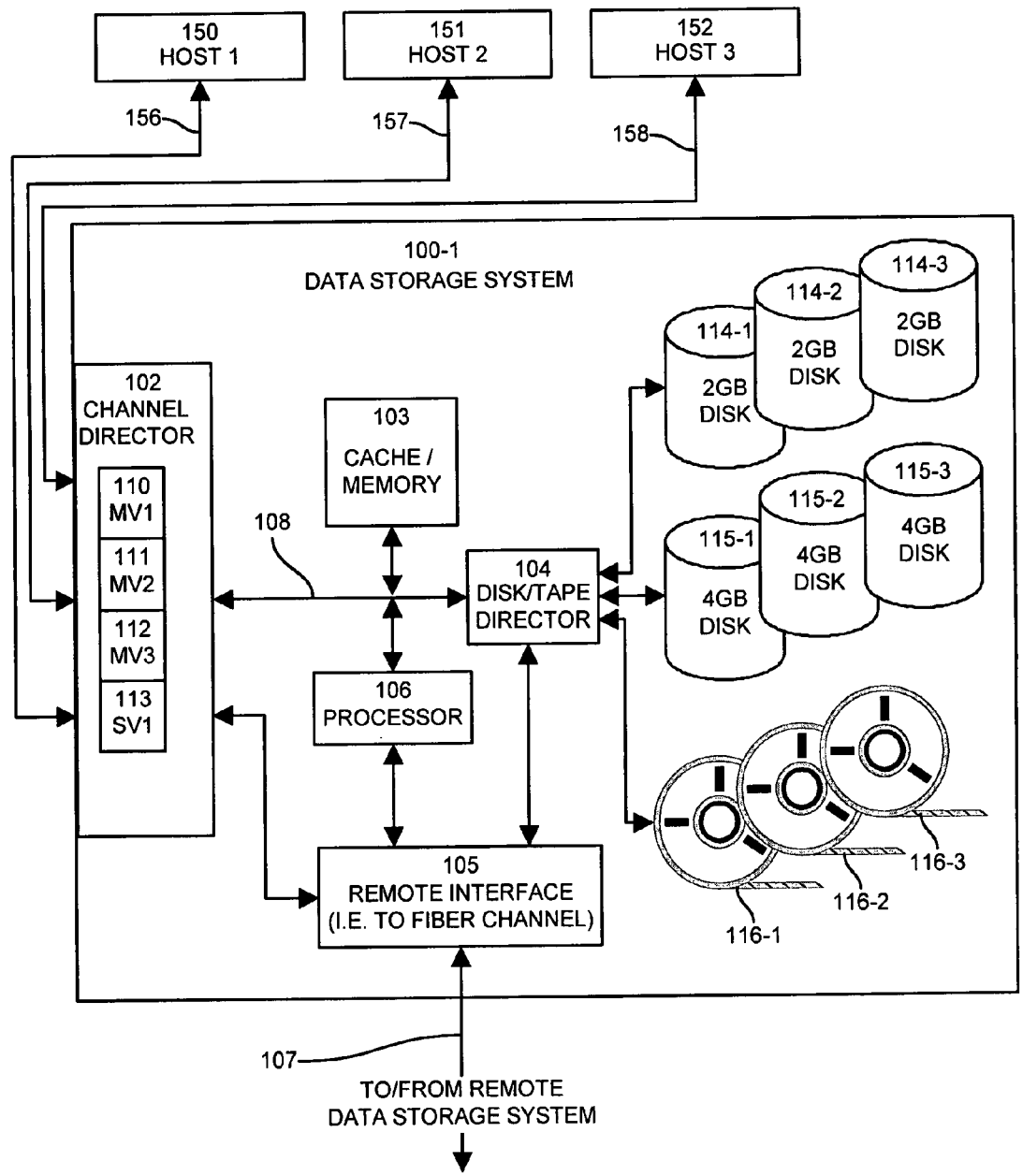
FIG. 1 is an example of a data storage system illustrating example configurations of volumes configured according to the invention.

FIG. 1 illustrates an example embodiment of a data storage system 100-1 configured according to the invention. The data storage system 100-1 includes a plurality of storage devices 114 through 116 which, in this example, specifically include three two-gigabyte disk drives 114-1 through 114-3 (collectively 114), three four-gigabyte disk drives 115-1 through 115-3 (collectively 115), and three tape drives 116-1 through 116-3 (collectively 116). The storage devices 114 through 116 provide physical or "raw" data storage which maintains data in a binary format within the data storage system 100-1.

Each storage device 114 through 116 interfaces with a disk or tape (disk/tape) director 104. A system bus 108 interconnects the disk/tape director 104 to a cache memory 103, a processor 106, and a channel director 102. The channel director 102, as will be explained, provides the hardware and software interfaces which allow connections 156 through 158 from the host computing devices 150 through 152 to access (read and/or write) data within the data storage system 100-1. A remote interface 105 interconnects with the disk/tape director 104, the processor 106 and the channel director 102, and provides a mechanism 107 for interfacing the data storage system 100-1 to one or more other data storage systems (not shown in this figure).

FIG. 1 illustrates a plurality of volumes 110 through 112 within the channel director 102, as well as a "standard" volume 113. The volumes 110 through 112 operate according to embodiments of the invention as explained herein, while the standard volume 113 operates in a conventional manner. It is to be understood that a data storage system (e.g., 100-1) configured according to embodiments of the invention may include both standard volumes (e.g., 113) and volumes (e.g., 110 through 112) of the invention, or may use only volumes of the invention (e.g., 110 through 112) and the techniques described herein exclusively. The standard volume 113 is not required for a data storage system configured according to the invention and is only provided to illustrate the differences between volumes of the invention (e.g. 110 through 112) and standard volumes (e.g. 113).

The terms "volume" refers to a volume configured according to embodiments of the invention. However, when prefaced with the term "standard", the phrase "standard volume" is specifically used herein to reference techniques associated with conventional volumes of data storage. As noted above, the standard volume 113 is provided in this example only to highlight distinctions between the volumes provided in a data storage system configured according to the invention as compared to standard volume implementations. Generally, both the standard volume 113 and the volumes 110 through 112 allow host computing devices 150 through 151 to interface with the data storage system 100-1 to access data maintained on the storage devices 114 through 116.

FIG. 1 illustrates certain aspects of the invention in comparison to conventional data storage system access techniques. A high level overview of the system and methods of the invention will now be presented to allow the reader to better understand and appreciate more detailed aspects of the invention, which are presented later.

Typically, a systems administrator (not shown) establishes the standard and volumes 110 through 113 during an initial setup and configuration process that is performed when the data storage system 100-1 is coupled to one of host computing devices 150 through 152. A software application provided within the operating system (not specifically shown) on the host 150 through 152 that couples to the data storage system 100-1 can be used to perform volume configuration. Alternatively, a software application designed to specifically operate and manage the data storage system 100-1 can be used to configure the volumes 110 through 113.

The systems administrator configures the standard volume 113 by creating a standard volume 113 (SV1) within the channel director 102 and associating one or more storage devices 114 through 116 (or portions and/or combinations thereof) to the standard volume 113. The association indicates which storage devices 114 through 116 are to provide the physical data storage for the standard volume 113. The amount of storage space within storage devices 114 through 116 that are associated with the standard volume 113 during configuration inherently defines a storage size (not specifically shown in this figure) of the standard volume 113. There must be at least some amount of storage space (i.e., at least a portion one of storage devices 114 through 116) associated with the standard volume 113 in order for the configuration process to create a standard volume 113 in the channel director 102. Once configured, the standard volume 113 has a fixed storage size that is equal to the amount of storage space within the storage devices 114 through 116 that the systems administrator associated with the standard volume 113.

A host computing device (i.e., one of hosts 150 through 152) that is used to configure the standard volume 113 is the generally the same host that mounts the standard volume 113 once the standard volume 113 is defined. For instance, if the host 150 configures the standard volume 113 with an association to one or more portions of storage devices 114 through 116, then that host 150 subsequently mounts the standard volume 113. This is because configuration of the standard volume 113 entails writing certain host-specific access information to a designated portion, such as Block 0 (not shown in this figure), of the standard volume 113. The host-specific access information in Block 0 is generally unique to the architecture or the version of the operating system used by the host 150. In order for another host 151 and/or 152 to interface directly to the standard volume 113, the host-specific access information within block 0 of the standard volume 113 must be the same as that required by the other host attempting access. Once the standard volume 113 is mounted to the host 150, software applications (not shown) that execute on the host 150 can read and write data to the storage space in storage devices 114 through 116 that are associated with the standard volume 113.

To increase or decrease the amount of storage space associated with the standard volume 113, a systems administrator must disable access to the standard volume 113 from any applications and/or users on the host computing device (one of 150 through 152) that mounts the standard volume 113. Essentially, the standard volume 113 is brought off-line while it is reconfigured with a different association of portions of storage devices 114 through 116. After the standard volume 113 is reconfigured with more or less storage space, a host (one of 150 through 152) that requires access the newly configured standard volume 113 must be rebooted in order to for the host to re-detect the standard volume 113 within the data storage system 100-1.

In this manner, the standard volume 113 provides an interface to a certain static amount of data storage space within the storage devices 114 through 116 in the data storage system 100-1 for one of the hosts 150 through 152. The actual amount of storage space is fixed in size once the standard volume 113 is configured and governs the storage size of the standard volume 113. Changing the amount of storage space in a standard volume 113 requires an offline reconfiguration process and host computing devices 150 through 152 must be rebooted to detect the reconfigured standard volume 113. Moreover, access to the standard volume 113 is generally only available to hosts 150 through 152 that have the same operating system and that use the same host-specific access information maintained within a designated portion of the standard volume 113.

The volumes 110 through 112 are created by a configuration process (to be explained) provided by the invention. However, in contrast to the standard volume 113, which requires some amount of associated storage space and which has a storage size defined exactly by that associated amount of storage space, according to this invention, the volumes 110 through 112 are not required to have an association to any portions of storage space within storage devices 114 through 116 (though they may) in order to exist in the channel director 102. That is, the configuration process of the invention can create the volumes 110 through 112 as virtual interfaces to the data storage system 100-1 that are visible to the host computing devices 150 through 152, but that need not have any actual associated amount of storage space assigned or associated to them within the data storage system 100-1.

Another aspect of the volumes 110 through 112 of this invention is that they can have an arbitrary storage size (not specifically shown in FIG. 1). The configuration process of the invention allows independent selection or setting of the storage size for a volume 110 through 112. Moreover, the storage size does not require any relationship (though it may have such a relationship) to any portions of storage devices 114 through 116 that may (or may not) be associated with the volumes 110 through 112. By way of example, the initial configuration process can be used to set the storage size for a volume 110 through 112 to ten gigabytes, while the actual amount of total data storage within storage devices 114 through 116 that is allocated to, or associated with, the volume 110 may only be five gigabytes, or even zero gigabytes (i.e. no data associated data storage associated with the volume). The techniques of the invention allow the volumes 110 through 112 to exist in the channel director 102, even though there may be no storage space associated with the volumes 110 through 112.

Also, unlike the standard volume 113, as applications executing on the host computing devices 150 through 152 begin to utilize more and more storage space associated with mobiles volume 110 through 112, according to this invention, a dynamic reconfiguration process provided by the invention can be used to reconfigure the volumes 110 through 112 in real-time (as will be explained with respect to FIGS. 4 and 5) to have associations with more or less actual storage space within the storage devices 114 through 116. The dynamic reconfiguration process for a volume 110 through 112 can performed volume reconfiguration without requiring the volume to go offline from the perspective of hosts 150 through 152, as is the case when prior art reconfiguration process are used to reconfigure the standard volume 113. That is, the data storage system 100-1 can perform a dynamic reconfiguration process automatically without disturbing the interfaces 156 through 158 between the volumes 110 through 112 and the host computing devices 150 through 152. A systems administrator does not need to isolate or take off-line the data storage system 100-1 and/or the volumes 110 through 112 from the hosts 150 through 152 during the dynamic reconfiguration process of the invention. The dynamic reconfiguration process can also take place automatically in response to various triggering events. Furthermore, there is no need to restart the host computing devices 150 through 152 in order to detect the reconfigured volumes 110 through 112.

According to another technique of the invention, multiple host computing devices 150 through 152 using different operating systems can simultaneously interface with a single volume (i.e. one of 110, 111 or 112). Generally, as will be discussed in more detail, the volumes 110 through 112 can maintain separate host-specific access information (not shown) for each host computing device 150 through 152. By storing the host-specific access information for multiple hosts 150 through 152, a volume 110 through 112 can present the proper access information specifically required by the operating system on a host computing device 150 through 152 that requests access to the volumes 110 through 112.

Figure 2:
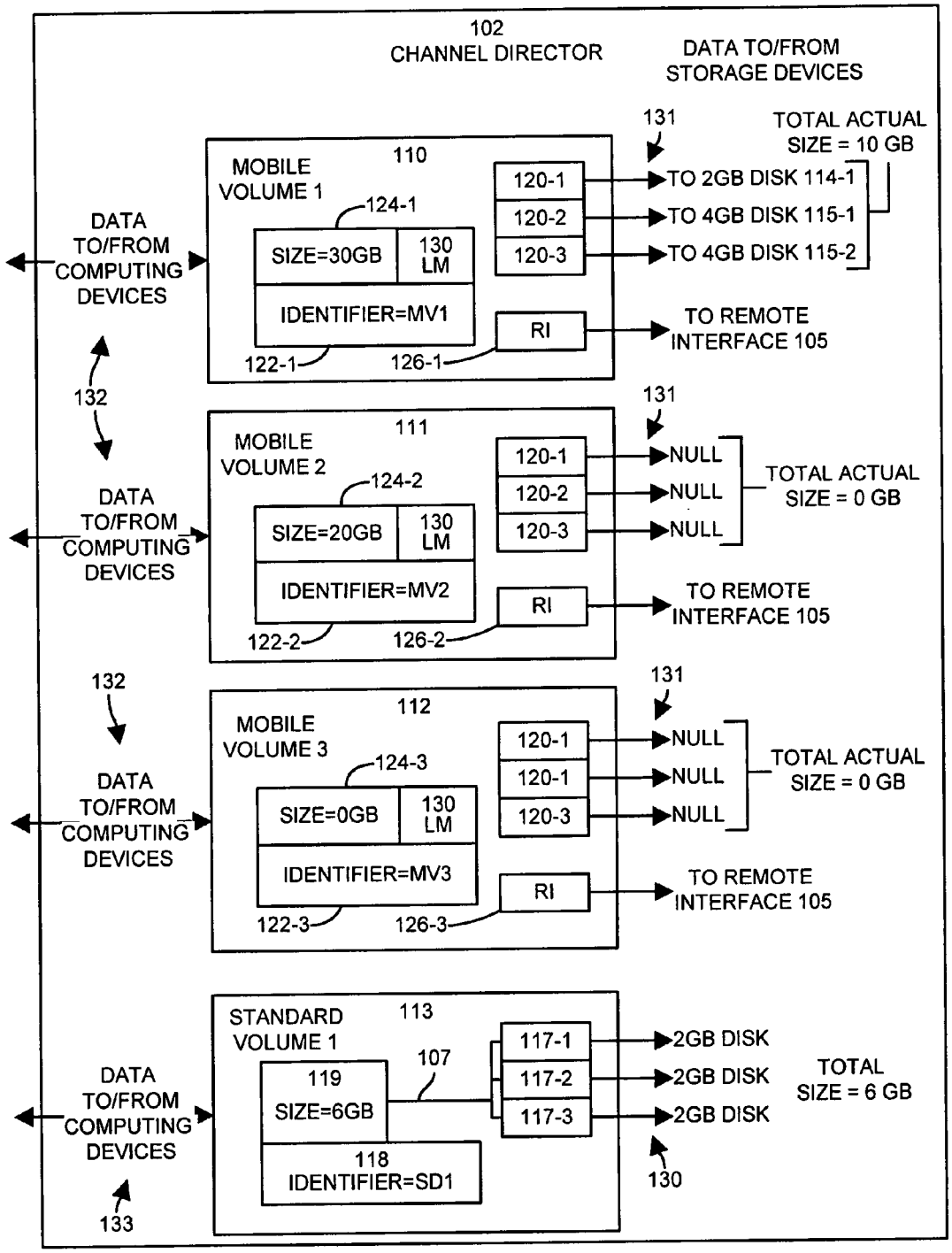
FIG. 2 illustrates a more detailed view of a channel director within a data storage system that contains volume interfaces configured according to various example embodiments of the invention.

FIG. 2 provides a more detailed illustration of the channel director 102 including the standard volume 113, and the volumes 110 through 112 within the data storage system 100-1, as configured according to various embodiments of the invention. The different configurations of the volumes 110 through 112 in FIG. 2 demonstrate some of the characteristics of embodiments of the invention that were previously discussed at a high-level with respect to FIG. 1.

In this example, each volume 110 through 112 is illustrated as a data structure within the channel director 102, which may be a programmable memory device, for example. Each volume 110 through 112 includes a storage size 124, an associated identifier 122, a plurality of storage device interfaces 120 (three in this example—120-1 through 120-2), a label manager 130 (abbreviated LM in this figure), and a remote interface 126. Each volume 110 through 112 is respectively labeled VOLUME 1, VOLUME 2 AND VOLUME 3 in contrast to the standard volume 113 which is labeled STANDARD VOLUME 1.

The standard volume 113 includes device interfaces 117-1, 117-2 and 117-3, each of which in this example has two gigabytes of associated storage space within one or more of the storage devices 114 through 116 (FIG. 1). The standard volume 113 also includes a storage size 119, which is equal to six gigabytes in this example. As represented by interface 107, the storage size 119 of the standard volume 113 is completely dependent on how much total storage space (i.e., within storage devices 114 through 116) is associated with the standard volume 113 via the interfaces 117. In other words, the six gigabyte storage size 119 in this example is a cumulative sum of all of the storage space referenced by interfaces 117 within any of the storage devices 114 through 116. During configuration of the standard volume 113, the system administrator does not set the storage size 119. Rather, the systems administrator simply associates a certain amount of storage space within the storage devices 114 through 116 to the standard volume 113 via interfaces 117. The amount of storage space referenced by the interfaces 117 thus determines the value of the storage size 119 of the standard volume 113. A standard volume must have some storage space referenced by at least one of the interfaces 117 in order for the standard volume 113 to exist within the channel director 102.

The three volume entries 110 through 112 in this example illustration are each configured according to various embodiments of the invention. None of the illustrated configurations of volume entries 110 through 112 can be achieved using prior art or standard volume techniques, such as those discussed with respect to standard volume 113.

Volume 110 illustrates an embodiment of the invention in which the storage size 124-1 is different in value from the actual amount of storage space within storage devices 114 through 116 referenced via interfaces 120-1 through 120-3. As illustrated, each interface 120-1 through 120-3 is associated with a two gigabyte disk 114-1 through 114-3, respectively, for a total amount of six gigabytes of actual storage space that is associated with the volume 110. However, as presently configured, the storage size 124-1 indicates a value of thirty gigabytes of available data storage. The storage size 124-1 having the thirty gigabyte value is provided to any hosts 150 through 152 that attempt to access the volume 110. Accordingly, the volume 110 provides the appearance to the hosts 150 through 152 that it has thirty gigabytes of data storage available, when in reality, only a total of six gigabytes from data storage devices 114 through 116 are actually associated with the volume 110.

The disparity between the actual amount of data storage devices 114 through 116 that are associated with the volume 110 via interfaces and the storage size 124-1 that is presented externally to hosts 150 through 152 is made possible in the invention by allowing the storage size 124-1 to be set or selected during volume configuration independently of the association process of storage devices 114 through 116 for the volume 110.

By presenting a storage size 124-1 that may be different than an actual amount of storage space associated with the volume 110, this embodiment of the invention allows applications on host computing devices 150 through 152 that require minimum amounts of storage space in a volume to execute properly without actually initially committing (i.e. associating) the required minimum amount of storage space to the volume 110 within the data storage system 100-1. The invention also allows the volume 110 to associate more actual storage space within storage devices 114 through 116 to the volume 110 as the actual amount of storage (the six gigabytes referenced via interfaces 120-1 through 120-3 in this example) begins to be fully utilized or consumed with data from an application executing on the hosts 150 through 152. The association of additional storage space to the volume 110 can be performed without interrupting either the application on the hosts 150 through 152, or the interfaces 156 through 158 between the hosts 150 through 152 and the data storage system 100-1.

The volume 111 in FIG. 2 illustrates another configuration of a volume according to an embodiment of the invention. In the volume 111, the storage size 124-2 indicates to the hosts 150 through 152 that twenty gigabytes of data storage is available. However, as presently configured, the data storage device interfaces 120-4 through 120-6 in the volume 111 are not associated with any portions of the storage devices 114 through 116.

The volume 111 thus presents itself to the external hosts 150 through 152 as a twenty gigabyte volume of data storage, when in reality, no storage is currently allocated to or available within the volume 111. Again, this configuration is made possible in the invention by allowing the storage size 124-2 of the volume 111 to be configured independently of any association that may or may not exist (the later in this example), to storage space within the storage devices 114 through 116.

The volume 111 is useful in situations where an application that executes on one or more of the host computing devices 150 through 152 requires that a volume have a minimum size. In other words, volume 111 is useful when a volume of a certain size that is greater than zero merely needs to be "visible" to the hosts 150 through 152. The invention provides a mechanism to detect when a data access to the volume 111 is required and allows the data storage system 100-1 to associate storage space with the volume 111 on-the-fly so that the data access can be carried out.

The volume 112 in FIG. 2 illustrates yet another example configuration of an embodiment of the invention. The volume 112 is configured to have a storage size 124-3 that contains a value of zero and also has no portions of storage devices 114 through 116 associated with the data storage device interfaces 120-7 through 120-9. The volume 112 is useful in situations where an application on one or more of the hosts 150 through 152 requires that a volume simply be present or visible to the host and that the host or application does not, at that time, actually require read or write access to any data in the volume.

An example use of volume 112, which has a size of zero (124-1) and no associated storage space, is when a data-backup application exists on a host 150 and is responsible for periodically backing up all of the data storage devices 114 through 116 to a tape backup device (not shown) which is external to the data storage system 100-1. During periods when the data-backup application is not in use, the volume 112 can have all associated storage space removed (as illustrated by interfaces 120-7 through 120-9 which reference NULL) and can have its storage size 124-3 set to zero. Since the storage size 124-3 is zero, no applications on the hosts 150 through 152 will attempt to mount and/or access data within the volume 112. The volume 112, however, which is only used during backups, never "disappears" from the "view" of the hosts 150 through 152, and thus does not require the hosts 150 through 152 to be rebooted in order to detect a special volume used only for backing up data.

During periods when backup operations are underway, the volume 112 can be used as the backup volume and can have associations with various amounts of storage space within storage device 114 through 116 created as needed via interfaces 120-7 through 120-9. The backup application can work in conjunction with the data storage system 100-1 to cyclically associate portions of storage space from storage devices 114 through 116 to the volume 112, then backup those portion to tape, and then disassociate those portions and move on to associate another portion of storage space to the volume 112. This process can be repeated using the volume 112 as the backup focal point until all of the data in the data storage system 100-1 is archived.

The configurations of volumes 110 through 112 in FIG. 2 are illustrated as examples only, and are not limiting of the invention. As such, it is to be understood that other configurations of volumes can exist as well that are within the scope of this invention. For example, embodiments of the data storage system 100-1 may exist that provide a volume that has a storage size 124 that is dependent in some manner, but different from an actual amount of data storage associated with the storage devices 114 through 116 that are associated with the volume 110 through 112. Specifically, an example embodiment might provide a storage size 124 that is always five gigabytes more than the actual amount of data storage associated with the volume via interfaces 120. In this case, the storage size 124 selected at volume configuration time is dependent, but different, from the amount of data storage associated with the identified storage devices 114 through 116 that are associated with the volume 110 through 112.

In an alternative arrangement, the storage size 124 of a volume 110 through 112 can indicate a value that is less than the actual amount of storage space within devices 114 through 116 that is associated with the volume 110 through 112. By way of example, the storage size 124 of a volume (one of 110 through 112) may indicate eight gigabytes of available data storage, when in actuality, ten gigabytes are associated with the volume 110. Such a configuration is valuable in cases, for example, where an application on hosts 150 through 152 accidentally attempts to write an amount of data, such as nine gigabytes, to a volume configured in such a manner. In this case, the amount of data to be written exceeds the eight gigabyte value maintained within storage size 124, but is less than the ten gigabytes of associated storage space within storage devices 114 through 116. As such, the nine gigabytes of data is successfully written to the storage space associated with the volume 110, the successful write operation is reported back to the hosts originating the write request. At that point, the dynamic reconfiguration process of the invention can be used to associate more storage space within storage devices 114 through 116 to the volume. In essence, this configuration acts as overflow protection in attempts to write too much data to a volume.

Figure 3:
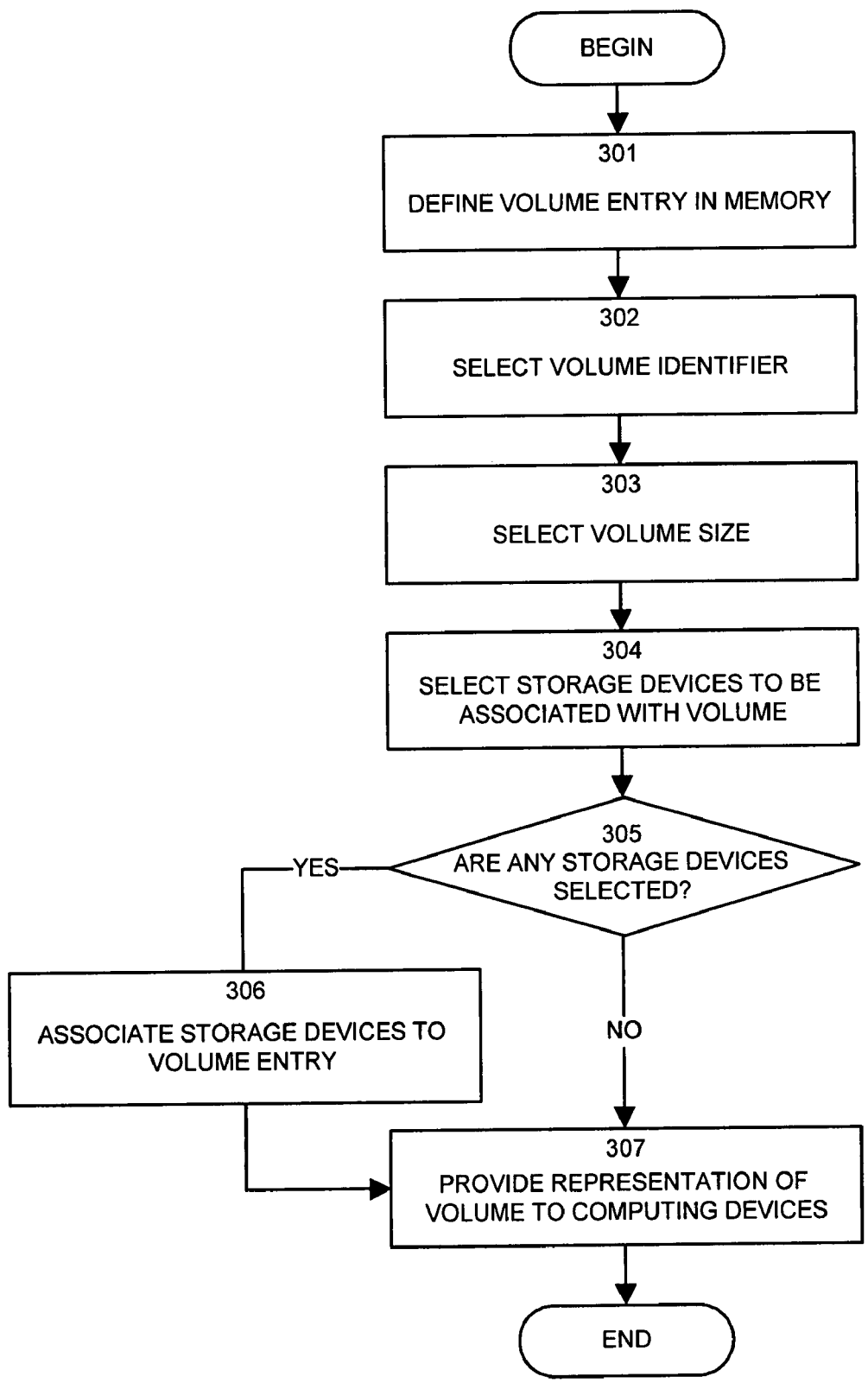
FIG. 3 is a flow chart of the processing steps used to create a volume within a data storage system according to one embodiment of the invention.

FIG. 3 shows the processing steps 301 through 307 that are performed according to one embodiment of the invention to create a volume within a channel director 102, such as volume 110 within the data storage system 100-1. Steps 301 through 307 are typically performed by data storage system configuration software executing as part of, or in conjunction with the operating system of a host computing device (i.e. one of 150 through 152) that interfaces with the data storage system 100-1. Alternatively, the data storage system 100-1 may include its own internal software configuration program accessed via a direct systems administrator console which is provided as part of the data storage system 100-1. The processor 106 may execute the instructions shown in any of the flow charts in this description in order to manipulate the channel director 102. Alternatively, the channel director 102 itself may include circuitry to process these instructions.

Processing begins at step 301 by defining a volume 110 in memory within the data storage system 100-1. Preferably, the memory is part of the channel director 102. Next, in step 302, a value for the volume identifier 122 (FIG. 2) is selected (or set) and associated with the volume 110. In step 303, a value for the storage size 124 is selected for the volume 110. The storage size 124 set in step 303 can be any value, including zero.

After the volume (e.g. 110) is created (step 301) and has values assigned to the an identifier (i.e., 122, step 302) and a storage size (i.e., 124, step 303), a volume now exists in the channel director 102. The volumes 110 through 112 can exist when there are storage devices 114 through 116 associated with the volume entries, and even when there are no storage devices 114 through 116 associated with the volume entries. Next, in step 304, any storage devices 114 through 116 that are to be associated with the volume 110 are selected. In step 305, the processing determines if any portions of any storage devices 114 through 116 were selected for association with the volume 110. If so, processing proceeds to step 306 where the selected portions (from step 304) of the storage devices 114 through 116 are associated with the volume 110. Step 306 essentially establishes the pointers 131, as needed, from interfaces 120 to the selected storage devices 114 through 116. If an interface 120 is not used, it is set to a NULL value, indicating that no storage space is associated with that interface 120.

After step 306 is complete, or, if no storage devices 114 through 116 were selected (step 304) to be associated with the volume, processing proceeds to step 307, at which point the volume is provided as a volume of available data storage to host computing devices 150 through 152.

The volumes 110 through 112 are preferably accessible via the associated identifier stored in location 122. Since the storage size 124 for a volume 110 through 112 is configured in step 303 independently of any storage devices 114 through 116 that are to be associated with the volume, any of the volume configurations 110 through 112 discussed above with respect to FIG. 2 are possible as a result of the processing in FIG. 3. Once a volume 110 through 112 is configured according to steps 301 through 307, it can be accessed as a regular volume of data storage by any of the hosts 150 through 152. As will be explained next, if storage space needs to be added or removed from a volume configured according to the steps in FIG. 3, a dynamic reconfiguration process is used which allows host computing devices 150 through 152 to remain interfaced with the volumes 110 through 112 during reconfiguration.

Figure 4:
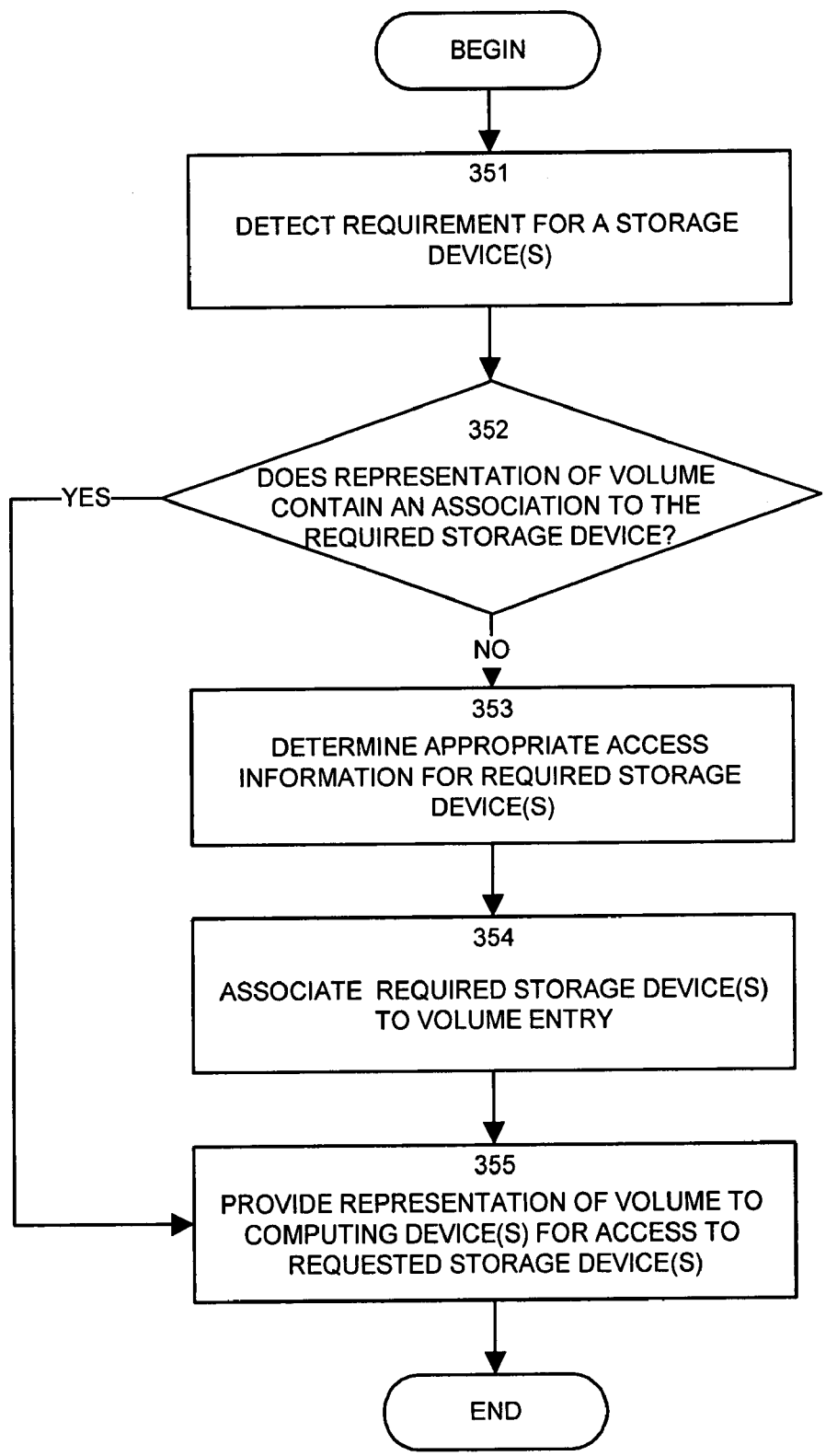
FIG. 4 is a flow chart of the processing steps used to dynamically reconfigure a volume to allow more storage space to be associated with the volume according to one embodiment of the invention.

FIG. 4 shows the processing steps 351 through 355 that allow a volume 110 through 112 of the invention to dynamically be reconfigured according to the invention. The dynamic reconfiguration process of FIG. 4 allows the actual amount of storage space that is associated with a volume 110 through 112 to be altered while the interfaces 156 through 158 (FIG. 1) to host computing devices 150 through 152 remain intact. That is, the hosts 150 through 152 continually perceive that the volume exists before, during and after dynamic volume reconfiguration according to step 351 through 355. There is no need to unmount a volume 110 through 112 from a host 150 through 152 during reconfiguration, nor is there a need to reboot the host(s) 150 through 152 or bring them into any special operating mode, such as single user mode.

Generally, the operation of steps 351 through 355 in FIG. 4 may be prompted by a need to reconfigure a volume 110 through 112 in response to some stimulus. For example, as illustrated in FIG. 2, the dynamic reconfiguration process of FIG. 4 is invoked if a host 150 through 152 attempts to access data within either one of volumes 111 or 112 as configured in that illustration. This is because, as illustrated, there are no actual storage devices 114 through 116 associated with either volume 111 or 112, as indicated by the interfaces 120-4 through 120-9 referencing NULL values. In these two examples, reconfiguration involves associating more storage space (i.e. portions of storage devices 114 through 116) to the volumes 111 or 112, though the invention also allows dynamic reconfiguration in order to remove or disassociate storage space from a volume, as will be explained with respect to FIG. 5.

In step 351, the processing detects a requirement for one or more storage devices (e.g., 114 through 116) within a volume (e.g., 110 through 112). The requirement may be in response to an attempted access (read and/or write) to data within the volume via one of the hosts 150 through 152. From the perspective of the host(s) 150 through 152, the required storage device 114 through 116 may be understood to already be associated with the volume 110 through 112 to which access is made. Thus, upon the occurrence of step 351, the volume may already have some associated storage space, such as that illustrated in the configuration of volume 110 in FIG. 2, or no storage space may yet be associated with the volume, as illustrated in the configurations of volumes 111 and 112, as discussed above.

Step 351 may also be initiated in response to detecting a presence of a threshold amount of occupied storage associated with the volume. This may be the case, for example, then the storage size 124 of a volume 110 through 112 is always maintained at a greater value than the actual amount of data storage associated with the volume 110 through 112. As such, as the total amount of actual storage spaced becomes occupied (i.e., written to), a threshold amount of occupied storage may be exceeded at which point steps 351 through 355 are triggered to add more storage space to the volume.

Alternatively, step 351 may be triggered by a trend analysis of data storage usage within the data storage system 100-1. In this case, trend analysis software in either one or more of the hosts 150 through 152 or in the data storage system 100-1 may determine patterns or periods of use requiring various amounts of actual data storage space to be available within a volume 110 through 112 during certain time periods. During peak usage periods, the trend analysis software may trigger the initiation of steps 351 through 355 in order to add or remove (i.e. associate or disassociate) actual data storage to and from the volumes 110 through 112.

In any event, after a requirement for a particular storage device 114 through 116 (or a portion thereof) is detected for a specific volume 110 through 112 in step 351, step 352 then determines if the volume (for which the requirement for the storage device is detected in step 351) contains an association to an identity of the required storage device (i.e., an association to the required one of storage devices 114 through 116 or portion(s) thereof). That is, step 352 determines if the requested/required storage device is already associated with the volume. This can be done, for example, by determining if any of the storage device interfaces 120 currently reference (i.e., are presently associated with) the requested storage device 114 through 116. If the volume already contains an association to the required storage device 114 through 116 specified in step 351, processing proceeds to step 355 which provides the volume to the host computing device 150 through 152 for access to the requested storage device(s) 114 through 116. In other words, step 355 provides access to the required storage device 114 through 116 through the volume 110.

If, however, step 352 determines that the volume does not contain an association to the identity of the required storage device(s) 114 through 116 (from step 351), then processing proceeds to step 353 to determine the appropriate access information within the volume for the required storage device(s). Specific processing details of a preferred embodiment of step 353 will be explained in more detail later with respect to FIGS. 5 and 6. In general, however, step 353 obtains the necessary access information, which may be host specific, for the host 150 through 152 for the storage device 114 through 116 determined to be required in step 351. In other words, step 353 determines and obtains the proper access information allowing the host 150 through 152 to properly access the requested storage device 114 through 116.

Once the host-specific access information is obtained in step 353, step 354 creates, in the volume 110, an association to the identity of the required storage device 114 through 116. This may be accomplished, for example, by creating an association from one of the interfaces 120 within the volume to the requested storage device 114 through 116. After step 354 is complete, step 355 proceeds to provide the volume to the host computing device(s) 150 through 152 to allow access to the storage device(s) 114 through 116 which are associated with the volume. In this manner, the data storage system 100-1 can provide dynamic reconfiguration of a volume 110 through 112 to allow storage space to be added.

While the example processing steps 351 through 355 are explained in the context of adding an association to a storage device 114 through 116 within one of the volumes 110 through 112, similar processing can be used to remove associations to storage devices 114 through 116 from the volumes 110 through 112.

Figure 5:
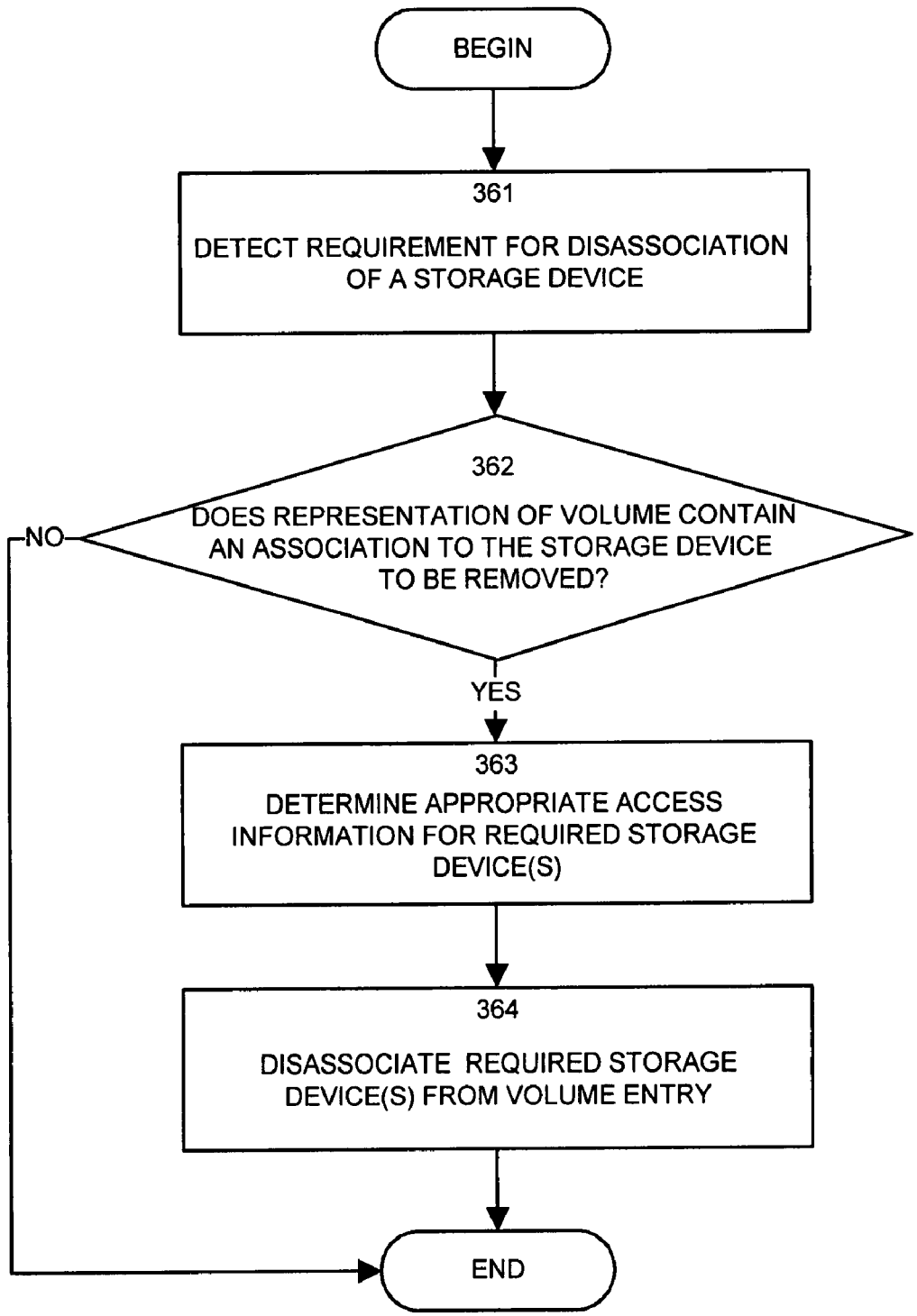
FIG. 5 is a flow chart of the processing steps used to dynamically reconfigure a volume to remove or disassociate storage space from the volume according to one embodiment of the invention.

FIG. 5 is a flow chart of processing steps 361 through 364 that are used to dynamically disassociate a storage device 114 through 116 with a volume 110 through 112 according to one embodiment of the invention.

In step 361, the processing detects a requirement for disassociation of a storage device 114 through 116 that already has an existing association with one of the volumes 110 through 112. Step 361 may be triggered, for example, by a process within the data storage system 100-1 that detects that a storage device 114 through 116 is about be removed form the data storage system 100-1 for repair. For each volume 110 through 112, step 362 then determines if that volume contains an association to the storage device (i.e., one or more of 114 through 116) to be removed. If so, step 363 determines the appropriate access information for the storage device to be removed. As will be explained shortly, such access information may be host-specific and may specify how to properly disassociate a storage device from a volume so as not to disturb the host, depending upon which hosts 150 through 152 are interfaced (via interfaces 156 through 158 in FIG. 1) to the volume. Once the access information for the storage device is obtained, step 364 disassociates the storage device from the volume 110 through 112.

In this manner, the invention is able to remove storage space from a volume 110 through 112 without adjusting or altering the storage size 124. Furthermore, the processing of steps 361 through 364 may be performed while maintaining the interfaces 156 through 158. This allows hosts 150 through 152 to be ignorant of the dynamic reconfiguration processing that takes place according to the processing in FIGS. 4 and 5.

The aforementioned embodiments of the data storage systems configured with the volumes 110 through 112 allow the data storage system 100-1, in conjunction with host computing devices 150 through 150, to overcome many of the problems associated with prior art volumes. By way of example, since the volumes 110 through 112 do not require any association to portions of storage devices 114 through 116 in order to exist as "visible" volume interfaces 156 through 158 within the channel director 102, storage space can be added and removed to and from the volumes 110 through 112 behind-the-scenes within the data storage system 100-1. This dynamic allocation of storage space to the volumes 110 through 112 can take place unbeknownst to the external host computing devices 150 through 152. This feature of the invention solves many of the problems experienced by prior art operating systems and application programs that experience faults when a volume "appears" and "disappears" within the channel director 102. Since the volumes 110 through 112 can always remain visible, even though storage devices 114 through 116 can become associated and disassociated with the volumes 110 through 112 over time, the operating system and applications can continue to operate as normal without faulting.

Moreover, since the volumes 110 through 112 of the invention have a storage size that is independently configurable from any storage devices 114 through 116 that may (or may not) be associated with the volumes 110 through 112, software applications and operating systems (not specifically shown) that execute on host computing devices 150 through 152 that require certain volume sizes can be easily accommodated. To do so, a volume 110 through 112 is configured with an arbitrary storage size 124 that is greater than any required amount expected by host applications or operating systems. Since the storage size 124 is independently selected from any associations to portions of storage devices 114 through 116 within the volumes 110 through 112, the data storage system 100-1 does not need to initially provide or allocate the actual amount of storage space in storage device 114 through 116 as specified in the storage size.

As indicated above, and in particular, with respect to steps 353 and 363 in FIGS. 4 and 5, the volumes 110 through 112 provided by this invention are able to allow multiple hosts 150 through 152 to simultaneously access data within the same volume 110 through 112. This can be accomplished in the invention even if the operating systems of the different hosts (e.g. host 150 through 152) are incompatible with each other with respect to any host-specific access information required for accessing individual storage devices (e.g. 114 through 116) within the volumes 110 through 112.

Figure 6:
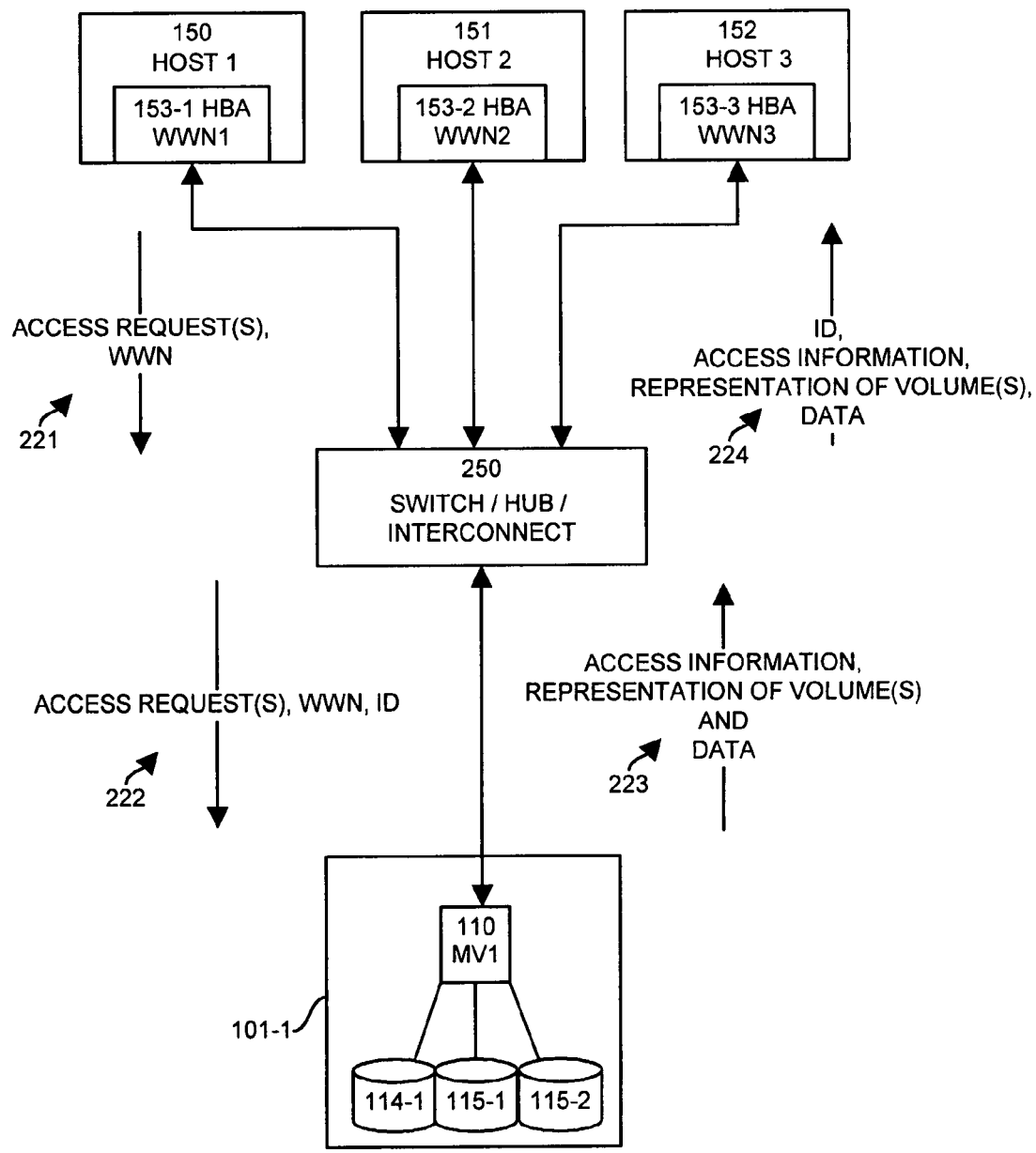
FIG. 6 illustrates an exchange of information between multiple host computing devices, a switch, and a data storage system which allows the multiple hosts to each access a single volume according to one embodiment of the invention.

FIG. 6 illustrates an example of multiple hosts 150 through 152 accessing the same volume 110 within the data storage system 100-1 through a switch 250. Each host 150 through 152 includes a respective host bus adapter (HBA) 153-1, 153-2 and 153-3. The host bus adapters 153 each contain a respective World Wide Name WWN1, WWN2 and WWN3. The World Wide Name (WWN) is a unique number or data sequence assigned to each host 150 through 152 that serves as a unique identifier for the host. For example, WWN1 for host 150 may include a value such as the MAC address (i.e. Ethernet networking address) of the host bus adapter 153-1. In this particular example, each host 150 through 152 interfaces to an interconnection switch or hub 250, which allows data transfers to take place between the hosts 150 through 152 and the data storage system 100-1

When one of the hosts (e.g. host 150) initially attempts to access the data storage system 100-1 through the switch 250, the host 150 provides an access request (e.g., a poll for volume information) along with the host's unique World Wide Name (WWN) to the switch 250, as indicated at 221 in FIG. 6. The switch 250 then generates and returns a unique ID to the requesting host 150 (as shown at 224), and forwards (as shown at 222) the host's access request, the host's World Wide Name and the assigned ID to the data storage system 100-1. After the initial exchange of the World Wide Name and the unique identification ID between the hosts 150 through 152 and the switch 250, the hosts 150 through 152 thereafter use the unique identification (ID) for any remaining data accesses to the volume 110. Generally, as will be explained in greater detail, the data storage system 100-1 uses the unique ID (ID1, ID2, ID3 and so forth) for a respective host 150 to 152 to identify the requesting host and to determine its World Wide Name. The World Wide Name is then used to obtain the proper access information (e.g. Block 0) required by a requesting host 150 through 152 to correctly access the requested volume (e.g. volume 110 in this example). The access information (not specifically shown in FIG. 6) is then returned through the switch 250 back to the requesting host 150, as indicated at 223 and 224.

Figure 7:
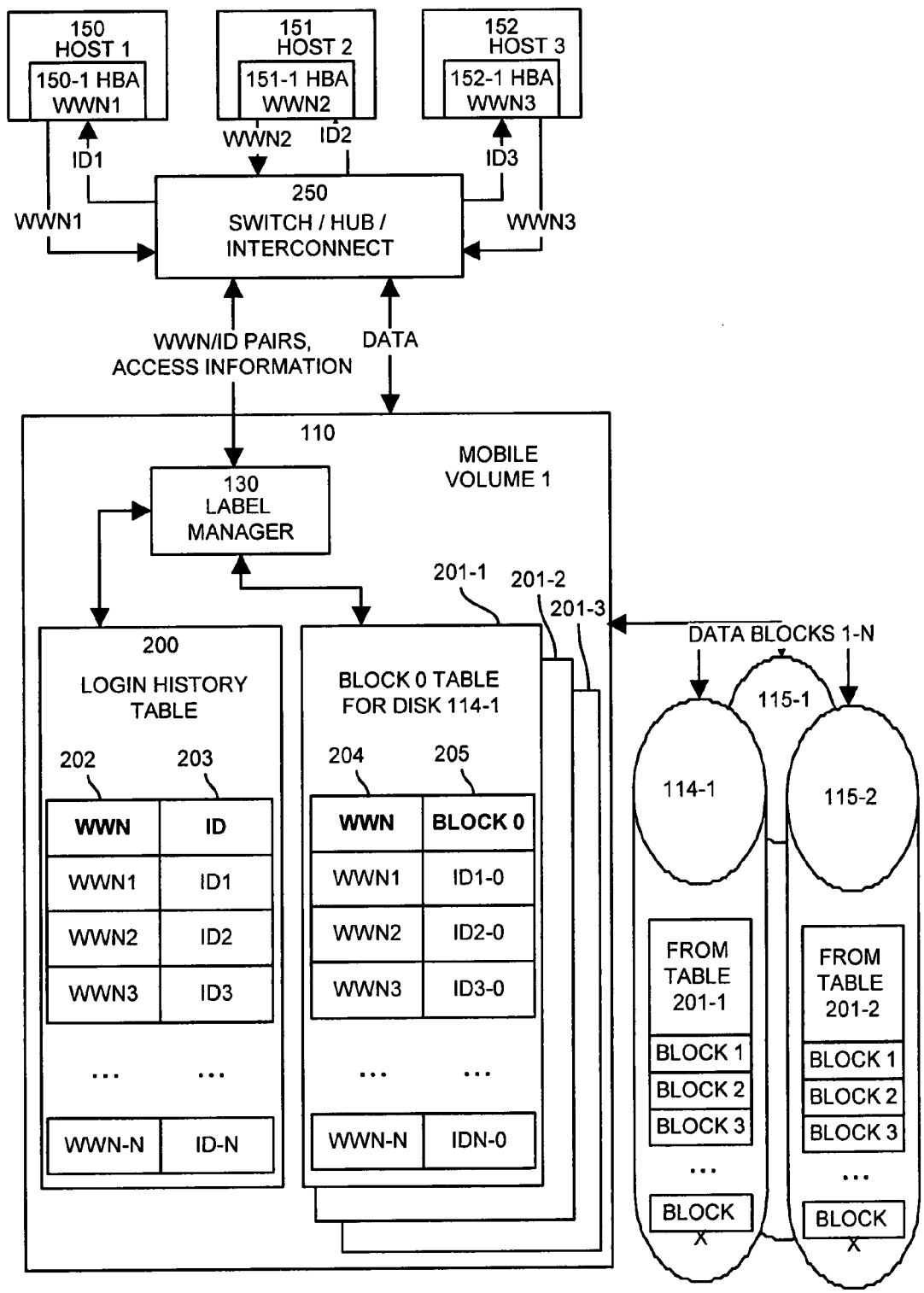
FIG. 7 is a more detailed illustration of a volume configured according to an example embodiment of the invention that allows multiple hosts to access data within storage devices associated with the volume.

FIG. 7 provides a more detailed embodiment of the volume 110 within the data storage system 100-1 which maintains access information 201 for the hosts 150 through 152 for each storage device 114 through 116 that is associated with the volume 110. As indicated this figure (and as indicated by storage device interfaces 120-1 through 120-3 in FIG. 2), the volume 110, as currently configured, is associated with three storage devices 114-1, 115-1 and 115-2 within the data storage system 100-1.

In this example, all three host computing devices 150 through 152 are able to access the storage devices 114-1, 115-1 and 115-2 within the volume 110. To do so, each host 150 through 152 during its initial communications with the switch 250 (as explained with respect to FIG. 6) provides its respective World Wide Name WWN1, WWN2 and WWN3 (collectively called WWN) to the switch 250. In response, the switch provides each host 150 through 152 with the unique identification, shown as ID1, ID2 and ID3, respectively. The switch 250 then forwards the World Wide Name and unique identification ID pairs WWN1/ID1, WWN2/ID2 and WWN3/ID3 for each host 150 through 152 to the label manager 130 within the data storage system 100-1. Within the volume 110 in FIG. 7, the label manager 130 maintains a login history table 200 and a number of access information tables 201 (three in this example; 201-1, 201-2 and 201-3). As will be explained, in this embodiment, for each volume 110 through 112, these tables maintain a database of access information for each storage device 114 through 116 that is associated with the volume.

The login history table 200 stores the World Wide Names 200-1 and the unique identifications 200-2 of each host 150 through 152 that is currently able to access data within the volume 110. Each entry (WWN/ID pair) in the login history table 200 is obtained and created once when a host 150 through 152 initially attempts to access the volume 110 (as illustrated in FIG. 6) via the switch 250. All access attempts from the hosts 150 through 152 after the first use the identification ID1, ID2, and so forth as assigned by the switch 250. As such, the login history table 200 is used to determine the World Wide Name associated with an access attempt based upon the identification ID of the host 150 through 152 that is attempting access to the volume 110.

The access information table 201 stores all of the host-specific access information (Column 2, labeled 205, with specific access information labeled ID1-0, ID2-0, IDN-0, where N is the index for the ID and the World Wide Name) for each host 150 through 152, for each storage device that is associated with the volume 110. In this example, since the volume 110 has three associated storage devices 114-1, 115-1 and 115-2, there are three access information tables 201-1, 201-2 and 202-3, one for each associated storage device 114-1, 115-1 and 115-2, respectively. Specifically, the access information table 201-1 maintains all of the host-specific access information (i.e., access information required by each host 150 through 152, no matter what operating system is used on that host) for the storage device 114-1, while the access information table 201-2 maintains all of the host-specific access information for the storage device 115-1, and the access information table 201-3 maintains the host-specific access information for the storage device 115-2.

Each access information table 201 includes a World Wide Name column 204 and an access information column 205. The World Wide Name column 204 provides an index that can be used to determine the host specific access information 205 (one of ID1-0, ID2-0, ID3-0 and so forth) for a respective host 150 through 152. Thus in this embodiment, lookup in the access information tables 201 are based on the World Wide Name (one of WWN1, WWN2, WWN3 and so forth) for the host 150 through 152, as determined by an identification (ID) lookup form the login history table 200.

In this particular embodiment, each entry (i.e. each row) in the access information column 205 of table 201-1 stores respective Block 0 information for the storage device 114-1 for one of the hosts 150 through 152. Also as illustrated, each storage device 114-1, 114-2 and 114-3 is comprised of a series of sequential blocks (Block 1, Block 2, Block 3, . . . . Block-X), with Block 0 being removed. The missing Block 0 information in each storage device 114-1, 115-1 and 115-2 within the volume 110 is maintained in column 205 in the respective host-specific access information tables 201-1, 201-2 and 203-3. By way of example, the entry WWN2/ID2-0 in table 201-1 contains Block 0 information (identified in this illustration as ID2-0) for storage device 114-1 for the host 151 which has the World Wide Name WWN2. Note that only access information table 201-1 is shown in detail. It is to be understood that access information tables 201-2 and 201-3 have similar access information that corresponds to storage devices 115-1 and 115-2, respectively.

Using the mechanisms shown in FIG. 7, the label manager 130 for the volume 110 is able to simultaneously accept and handle access requests for data stored within the storage devices 114-1, 115-1 and 115-2 from any of hosts 150 through 152. Since Block 0 information is maintained separately for each host 150 through 152, each host is able to properly handle data transactions in its own particular manner.

It is to be understood that while the label manager 130 is illustrated as being within the volumes 110 through 112 in FIGS. 2 and 7, alternative configurations of a data storage system 100-1 according to this invention may provide a single label manager 130 that executes on the processor 106 within the data storage system 100-1.

Figure 8:
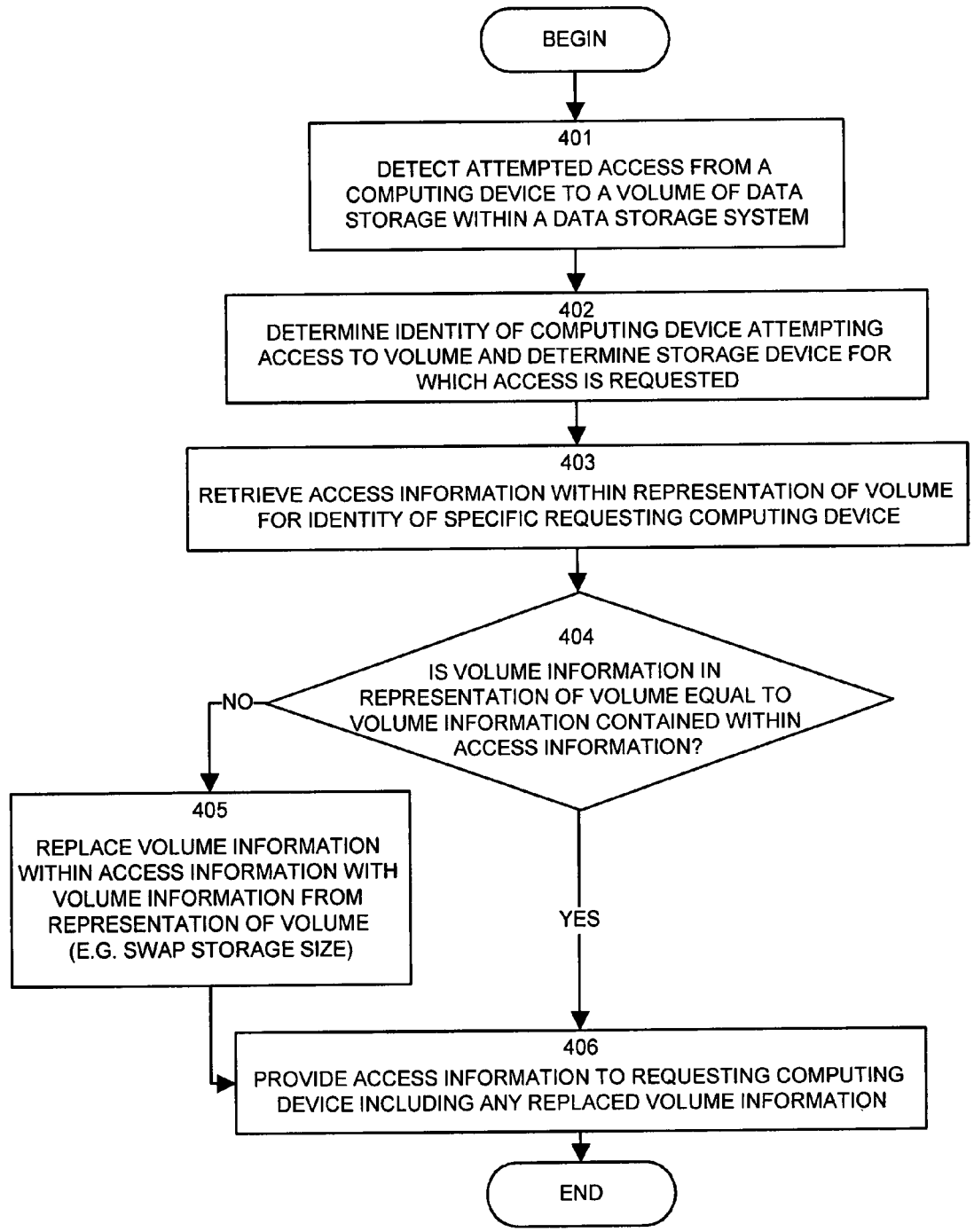
FIG. 8 is a flow chart of the processing steps performed to allow a volume to provide access by multiple hosts to data stored within the volume according to one embodiment of the invention.

FIG. 8 provides a flow chart of the processing steps performed by embodiments of the invention which allow multiple hosts (e.g. 150 through 152) to access a single volume (e.g., 110), as explained above with respect to the example embodiment illustrated in FIG. 7.

In step 401 in FIG. 8, the processing detects an attempted access from a host computing device 150 through 152 to a volume of data (e.g., 110 in FIG. 7) within the data storage system 100-1. In step 402, the processing then determines the identity of the computing device (e.g., ID1, ID2, and so on) that is attempting to access (as detected in step 401) the volume and determines the specific requested storage device (e.g. 114-1, 115-1 or 115-2) within the volume (e.g., 110) for which access is requested. The requested storage device (e.g., 114-1) can be determined, for example, based upon the block address of data to be read or written to the volume, as specified in the access request detected in step 401.

In step 403, the processing retrieves the host-specific access information 205 for the requested storage device 114-1, 115-1 or 115-2 within the access information table 201. Step 403 uses both the login history table 201 and one or more of the access information tables 201, depending upon the location of data that is being read or written (i.e., accessed). The login history table 200 is used to determine the World Wide Name (WWN) for the host 150 through 152 that is requesting access to one or more of the storage devices 114-1, 115-1 and/or 115-2, based upon the host identification ID determined in step 402. Once step 403 has obtained the World Wide Name WWN for the requesting host, the proper Block 0 access information 205 (i.e., one of ID1-0, ID2-0, ID2-0) can be retrieved from the appropriate access information table 201-1, 201-2 and/or 201-3. In this manner, each host 150 through 152 can have separate access information retained within the volumes 110 through 112, which allows variations in operating systems or host architectures to have little effect on data storage and volume access requirements.

Once the access information 205 has been determined for the requesting host having the World Wide Name as determined by step 403, step 404 determines if the volume information (e.g., storage size 124, identifier 122) maintained within the volume (e.g., the volume 110 in FIG. 2) is equal to any volume information that may be contained or that may exist within the access information 205 obtained from the respective access information table 201 that is specific to the requesting host 150 through 152. In certain instances, the Block 0 access information 205, which is originally created by each of the hosts 150 through 152, may contain information such as an amount of storage originally associated with the volume 110 or the individual storage device 114-1. If this is the case, step 405 of the invention replaces the information originally created by the host in its host-specific block 0 access information 205 with the information as configured within the volume (i.e., one of 110 through 112).

As an example, suppose host 150 initially writes a five gigabyte size parameter indicating a total amount of storage space (five gigabyte) that is initially associated with volume 110 (from the perspective of host 150) in its Block 0 information (ID1-0 in column 205) in table 201-1 for storage device 114-1. Recall that the five gigabyte value presented to the host may be from the storage size location 124 within the volume. Recall that the storage size value 124 of the volumes 110 through 112 may change over time according to the embodiments of the invention. As such, in step 404, if the size parameter written by host 150 in its Block 0 information (obtained in step 403) does not properly coincide with the storage size 124-1 (FIG. 2) for the volume 110, step 405 replaces the size parameter value (i.e., the Block 0 value) with the volume storage size value maintained in storage size 124-1. This ensures that techniques employed by hosts 150 through 152 to determine storage sizes or other information cannot circumvent the features of volumes 110 through 112 of the invention.

When step 405 is complete, or if step 404 determines that the access information 205 does not contradict the volume information (e.g., storage size values 124, identifier values 122, and so forth), then step 406 provides the access information to the requesting host computing device 150 through 152 (e.g. 150 in this example). The access information includes any replaced volume information, if step 405 was executed. In this manner, the processing steps 401 through 406 allow multiple hosts 150 through 152 to access a single volume 110 through 112 at one time.

In embodiments of the volume entries 110 through 112 of this invention, the associated identifier 122 (FIG. 2) can be a persistent identification. By persistent identification, what is meant is that the identifier 122 used to reference the volume 110 through 112 is the same for one or more host computing devices 150 through 152. Thus, host 150, for example, perceives the availability of volume 110 using the same value of identifier 122 as, for example, hosts 151 and/or 152. Persistent identifiers 122 are also "visible" and accessible to other data storage systems. This feature of the invention allows a volume 110 through 112 to have other associated data storage devices (other than 114 through 116) located on other data storage systems (other than 100-1) that are different than data storage system 100-1.

Figure 9:
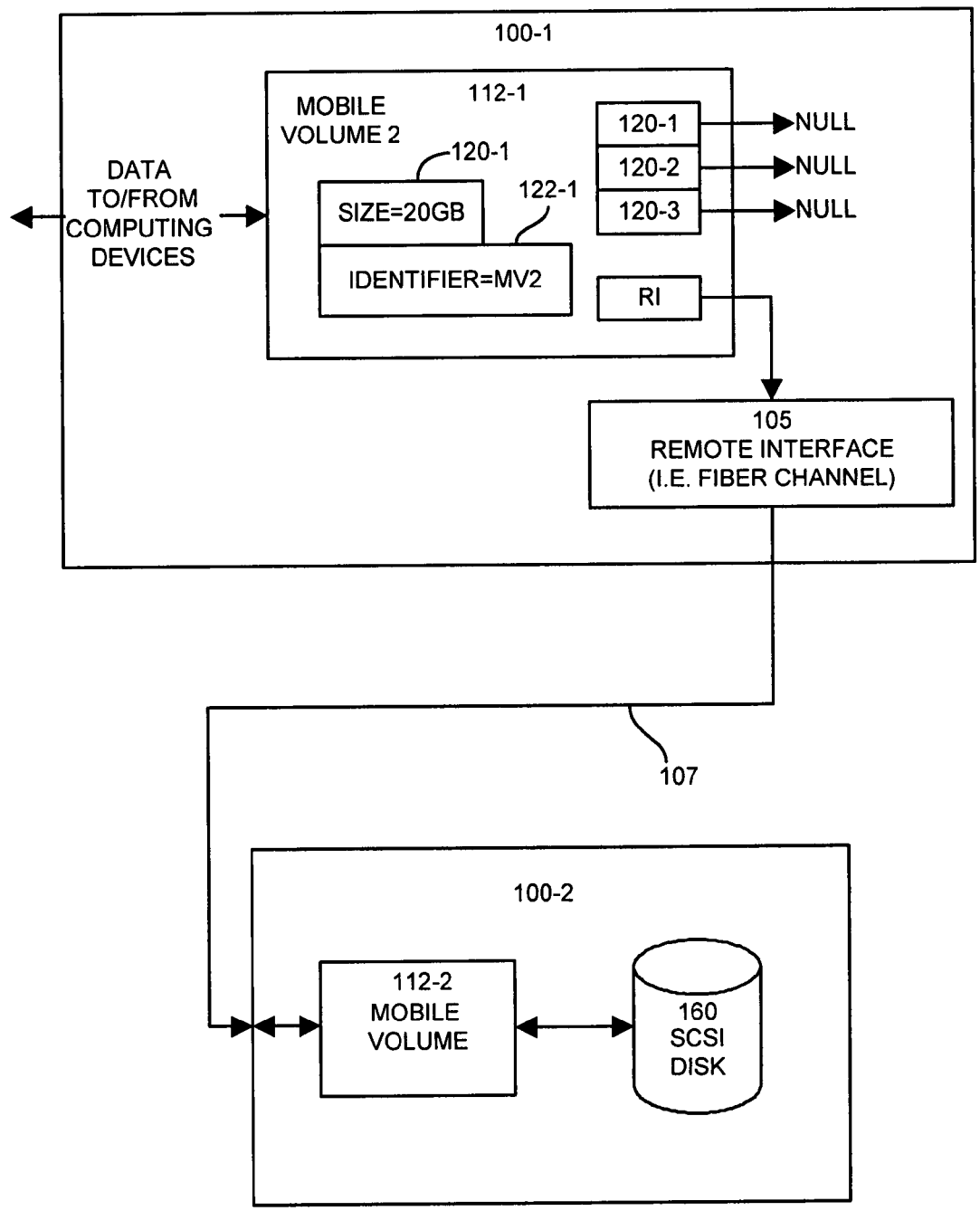
FIG. 9 is a block diagram illustrating how a persistent identification provided by a volume configured according to this invention can be used to allow the volume to reference data storage devices that are physically located in another data storage system.

FIG. 9 illustrates this aspect of the invention. In FIG. 9, two data storage systems 100-1 and 100-2 are illustrated. Each is aware, via the use of the persistent identifiers 122, of all of the volumes available within the other data storage system. Thus data storage system 100-2 can "see" volumes 110 through 112 in data storage system 100-1, and data storage system 100-1 can "see" volume 112-2 within data storage system 100-2. The two data storage systems 100-1 and 100-2 can interconnect 107 via remote interfaces 105 in each data storage system 100-1 and 100-2 to allow volumes to access data in other volumes.

In the specific illustrated example, volume 112-1 in data storage system 100-1 uses its remote interface 126-3 to reference 107, via the remote interface 105, data stored within the volume 112-2 which is maintained within the data storage system 100-2. This aspect of the invention allows volumes to obtain access to data stored remotely, and to present the remotely stored data (i.e., data stored in volume 112-2) to hosts (e.g., 150 through 152 coupled to data storage system 100-1) as if the data were stored locally. Since the volumes of the invention, as explained above, can have storage associated and disassociated at various times, without effecting host activity, volumes can remain on one data storage system 100-1 while referencing all of their data from another data storage system 100-2.

In embodiments of this invention, it is also to be understood that the exact location of the volume data structures 110 through 112 is not limited to existing within the channel director 102. For example, another component within the data storage system 100-1 such as the cache memory 103 can maintain the volume entries 110 through 112. However, since in the example data storage system 100-1, the channel director 102 provides the physical interfaces (i.e. 156 through 158 in FIG. 1) between each host 150 through 152 and the data storage system 100-1, the volume entries 110 through 112 are maintained therein. It is also to be understood that the processing steps of the flow charts explained above are generally preferably carried out by the processor 106 within the data storage system 100-1. Alternatively, there may be a dedicated channel director processor with the channel director 102 that handles the processing associated with the volumes of this invention.

While this invention has been particularly shown and described with references to preferred embodiments thereof, it will be understood by those skilled in the art that various changes in form and details may be made therein without departing from the spirit and scope of the invention as defined by the appended claims. The foregoing description of embodiments of the invention are not intended to be limiting. Rather, any limitations to the invention are presented in the following claims.

What is claimed is:

1. A method comprising:
maintaining a size parameter associated with a volume in a storage system, the size parameter representing a corresponding size of the volume for storing data;
maintaining references to specify storage space in the storage system allocated for use by the volume; and
via the size parameter, providing an appearance to at least one computer having access to the volume that the corresponding size of the volume is different than an amount of actual storage space of the volume for storing the data.

2. A method as in claim 1 further comprising:
maintaining at least one reference of the references as a null value that does not reference any actual storage space associated with the storage system.

3. A method as in claim 2 further comprising:
changing the at least one reference from the null value to a non-null reference value in order to add an amount of storage space to the volume.

4. A method as in claim 1 further comprising:
maintaining each of the references as a null value that does not reference any corresponding storage space associated with the storage system.

5. A method as in claim 1, wherein providing the appearance to the at least one computer includes providing the appearance to the at least one computer that the corresponding size of the volume is larger than the amount of actual storage space of the volume as defined by the references.

6. A method as in claim 1 further comprising:
allowing the at least one computer continuous access to the volume while allocating more storage space in the storage system to the volume.

7. A method as in claim 6, wherein allocating more storage space to the volume occurs in response to detecting that an available amount of unused storage space allocated for use by the volume crosses a threshold.

8. A method as in claim 1 further comprising:
in response to a usage analysis, modifying at least one of the references to change the amount of actual storage space allocated for use by the volume.

9. A method as in claim 1 further comprising:
maintaining the size parameter associated with the volume to be a substantially fixed value more than the amount of actual storage space associated with the volume.

10. A method as in claim 1, wherein maintaining the references to specify the storage space in the storage system allocated for use by the volume includes maintaining the references to point to storage devices of the storage system for storing the data.

11. An interface supporting access to a storage system, the interface comprising:
a processor;
a memory unit that stores instructions associated with an application executed by the processor, the processor supporting operations of:
maintaining a size parameter associated with a volume in the storage system, the size parameter representing a corresponding size of the volume for storing data;
maintaining references to specify storage space in the storage system allocated for use by the volume; and
via the size parameter, providing an appearance to at least one computer having access to the volume that the corresponding size of the volume is different than an amount of actual storage space of the volume for storing the data.

12. An interface as in claim 11 further supporting operations of:
maintaining at least one reference of the references as a null value that does not reference any actual storage space associated with the storage system.

13. An interface as in claim 12 further supporting operations of:
changing the at least one reference from the null value to a non-null reference value in order to add an amount of storage space to the volume.

14. An interface as in claim 11 further supporting operations of:
maintaining each of the references as a null value that does not reference any corresponding storage space associated with the storage system.

15. An interface as in claim 11, wherein providing the appearance to the at least one computer includes providing the appearance to the at least one computer that the corresponding size of the volume is larger than the amount of actual storage space of the volume as specified by the references.

16. An interface as in claim 11 further supporting operations of:
allowing the at least one computer continuous access to the volume while allocating more storage space in the storage system to the volume.

17. An interface as in claim 16, wherein allocating more storage space to the volume occurs in response to detecting that an available amount of unused storage space allocated for use by the volume crosses a threshold.

18. An interface as in claim 11 further supporting operations of:
in response to a usage analysis, modifying at least one of the references to change the amount of actual storage space allocated for use by the volume.

19. An interface as in claim 11, wherein maintaining the references to specify the storage space in the storage system allocated for use by the volume includes maintaining the references to point to storage devices of the storage system for storing the data.

20. A computer program product including a computer-readable medium having instructions stored thereon for processing data information, such that the instructions, when carried out by a processing device, enable the processing device to perform the steps of:
maintaining a size parameter associated with a volume in a storage system, the size parameter representing a corresponding size of the volume for storing data;
maintaining references to specify storage space in the storage system allocated for use by the volume; and
via the size parameter, providing an appearance to at least one computer having access to the volume that the corresponding size of the volume is different than an amount of actual storage space of the volume for storing the data.

* * * * *